United States Patent
Reynolds et al.

(10) Patent No.: US 10,079,616 B2
(45) Date of Patent: Sep. 18, 2018

(54) DEVICES AND METHODS FOR BACKSCATTER COMMUNICATION USING ONE OR MORE WIRELESS COMMUNICATION PROTOCOLS INCLUDING BLUETOOTH LOW ENERGY EXAMPLES

(71) Applicant: University of Washington, Seattle, WA (US)

(72) Inventors: Matthew S. Reynolds, Seattle, WA (US); Joshua F. Ensworth, Seattle, WA (US)

(73) Assignee: University of Washington, Seattle, WA (US)

( * ) Notice: Subject to any disclaimer, the term of this patent is extended or adjusted under 35 U.S.C. 154(b) by 0 days.

(21) Appl. No.: 15/249,167

(22) Filed: Aug. 26, 2016

(65) Prior Publication Data
US 2016/0365890 A1 Dec. 15, 2016

Related U.S. Application Data

(63) Continuation-in-part of application No. PCT/US2015/066820, filed on Dec. 18, 2015.
(Continued)

(51) Int. Cl.
*H04B 1/525* (2015.01)
*H04W 4/00* (2018.01)
(Continued)

(52) U.S. Cl.
CPC .............. *H04B 1/525* (2013.01); *H04B 1/10* (2013.01); *H04L 27/2602* (2013.01); *H04W 4/008* (2013.01); *H04W 4/80* (2018.02)

(58) Field of Classification Search
CPC ....... G06K 19/0723; G06K 2017/0045; G06K 7/10425; G01S 13/758; A63B 2225/54;
(Continued)

(56) References Cited

U.S. PATENT DOCUMENTS 4,298,280 A 11/1981 Harney
4,916,460 A 4/1990 Powell
(Continued)

FOREIGN PATENT DOCUMENTS

EP 2976734 1/2016
WO 2014153516 A1 9/2014
(Continued)

OTHER PUBLICATIONS

Advanced Television Systems Committee (ATSC) (Sep. 1995) "ATSC Digital Television Standard," ATSC Doc. A/53, 74 pages, Sep. 1995.
(Continued)

*Primary Examiner* — David S Huang
(74) *Attorney, Agent, or Firm* — Dorsey & Whitney LLP

(57) ABSTRACT

Examples described herein include devices and methods that may facilitate interoperability between backscatter devices and wireless communication devices. For example, backscatter devices and methods for backscattering are described that provide a transmitted backscattered signal formatted in accordance with a wireless communication protocol (e.g. Bluetooth Low Energy, WiFi, IEEE 802.11, or IEEE 802.15.4). Such communication may reduce or eliminate any modifications required to wireless communication devices necessary to receive and decode backscattered signals.

29 Claims, 6 Drawing Sheets

Related U.S. Application Data

(60) Provisional application No. 62/094,277, filed on Dec. 19, 2014, provisional application No. 62/107,149, filed on Jan. 23, 2015, provisional application No. 62/210,900, filed on Aug. 27, 2015.

(51) Int. Cl.
  *H04B 1/10* (2006.01)
  *H04L 27/26* (2006.01)
  *H04W 4/80* (2018.01)

(58) Field of Classification Search
  CPC ... H04B 5/0062; H04L 27/04; H04L 27/2627; H04W 4/80
  See application file for complete search history.

(56) References Cited

U.S. PATENT DOCUMENTS

| | | | |
|---|---|---|---|
| 5,220,330 A | 6/1993 | Salvail et al. | |
| 5,321,599 A | 6/1994 | Tanamachi et al. | |
| 5,649,296 A | 7/1997 | Maclellan et al. | |
| 5,663,710 A | 9/1997 | Fasig et al. | |
| 5,995,040 A | 11/1999 | Issler et al. | |
| 6,084,530 A | 7/2000 | Pidwerbetsky et al. | |
| 6,094,450 A | 7/2000 | Shockey | |
| 6,243,012 B1 | 6/2001 | Shober et al. | |
| 6,297,696 B1 | 10/2001 | Abdollahian et al. | |
| 6,611,224 B1 | 8/2003 | Nysen et al. | |
| 6,745,008 B1 | 6/2004 | Carrender et al. | |
| 6,765,476 B2 | 7/2004 | Steele et al. | |
| 6,870,460 B2 | 3/2005 | Turner et al. | |
| 6,970,089 B2 | 11/2005 | Carrender | |
| 7,180,402 B2 | 2/2007 | Carrender et al. | |
| 7,215,976 B2* | 5/2007 | Brideglall | G06K 7/0008 235/380 |
| 7,358,848 B2 | 4/2008 | Mohamadi | |
| 7,469,013 B1 | 12/2008 | Bolt et al. | |
| 7,796,016 B2 | 9/2010 | Fukuda | |
| 7,839,283 B2 | 11/2010 | Mohamadi et al. | |
| 7,961,093 B2 | 6/2011 | Chiao et al. | |
| 7,995,685 B2 | 8/2011 | Wang et al. | |
| 8,170,485 B2 | 5/2012 | Hulvey | |
| 8,284,032 B2 | 10/2012 | Lee et al. | |
| 8,391,824 B2 | 3/2013 | Kawaguchi | |
| 8,526,349 B2 | 9/2013 | Fischer | |
| 8,797,146 B2 | 8/2014 | Cook et al. | |
| 8,971,704 B2 | 3/2015 | Cavaliere et al. | |
| 9,312,950 B1 | 4/2016 | Deyle | |
| 9,680,520 B2 | 6/2017 | Gollakota et al. | |
| 2002/0015436 A1 | 2/2002 | Ovard et al. | |
| 2003/0043949 A1 | 3/2003 | O'Toole et al. | |
| 2003/0133495 A1 | 7/2003 | Lerner et al. | |
| 2003/0174672 A1 | 9/2003 | Herrmann | |
| 2004/0005863 A1 | 1/2004 | Carrender | |
| 2004/0210611 A1 | 10/2004 | Gradishar et al. | |
| 2005/0053024 A1 | 3/2005 | Friedrich | |
| 2005/0099269 A1 | 5/2005 | Diorio et al. | |
| 2005/0201450 A1 | 9/2005 | Volpi et al. | |
| 2005/0265300 A1 | 12/2005 | Rensburg | |
| 2006/0044147 A1 | 3/2006 | Knox et al. | |
| 2006/0045219 A1 | 3/2006 | Wang et al. | |
| 2006/0082458 A1 | 4/2006 | Shanks et al. | |
| 2006/0087406 A1* | 4/2006 | Willins | G06K 7/0008 340/10.3 |
| 2006/0220794 A1 | 10/2006 | Zhu | |
| 2006/0236203 A1 | 10/2006 | Diorio et al. | |
| 2006/0261952 A1 | 11/2006 | Kavounas et al. | |
| 2007/0018904 A1 | 1/2007 | Smith | |
| 2007/0046434 A1* | 3/2007 | Chakraborty | G06K 7/0008 340/10.1 |
| 2007/0069864 A1 | 3/2007 | Bae et al. | |
| 2007/0096876 A1 | 5/2007 | Bridgelall et al. | |
| 2007/0109121 A1 | 5/2007 | Cohen | |
| 2007/0111676 A1 | 5/2007 | Trachewsky et al. | |
| 2007/0115950 A1 | 5/2007 | Karaoguz et al. | |
| 2007/0201786 A1 | 8/2007 | Wuilpart | |
| 2007/0210923 A1 | 9/2007 | Butler et al. | |
| 2007/0285245 A1* | 12/2007 | Djuric | G08B 13/1427 340/572.1 |
| 2007/0293163 A1 | 12/2007 | Kilpatrick | |
| 2008/0131133 A1 | 6/2008 | Blunt et al. | |
| 2008/0136646 A1 | 6/2008 | Friedrich | |
| 2008/0165007 A1 | 7/2008 | Drago et al. | |
| 2008/0207357 A1* | 8/2008 | Savarese | A63B 24/0021 473/407 |
| 2008/0211636 A1 | 9/2008 | O'Toole et al. | |
| 2008/0225932 A1 | 9/2008 | Fukuda | |
| 2008/0252442 A1 | 10/2008 | Mohamadi et al. | |
| 2009/0201134 A1 | 8/2009 | Rofougaran | |
| 2009/0243804 A1 | 10/2009 | Fukuda | |
| 2010/0156651 A1 | 6/2010 | Broer | |
| 2010/0271188 A1 | 10/2010 | Nysen | |
| 2011/0053178 A1 | 3/2011 | Yang | |
| 2012/0001732 A1 | 1/2012 | Kawaguchi | |
| 2012/0002766 A1 | 1/2012 | Kawaguchi | |
| 2012/0051411 A1 | 3/2012 | Duran et al. | |
| 2012/0112885 A1 | 5/2012 | Drucker | |
| 2012/0311072 A1 | 12/2012 | Huang et al. | |
| 2012/0313698 A1 | 12/2012 | Ochoa et al. | |
| 2013/0028305 A1 | 1/2013 | Gollakota et al. | |
| 2013/0028598 A1 | 1/2013 | Cavaliere et al. | |
| 2013/0069767 A1 | 3/2013 | Ovard et al. | |
| 2013/0215979 A1 | 8/2013 | Yakovlev et al. | |
| 2013/0223270 A1 | 8/2013 | Cheng | |
| 2013/0265140 A1 | 10/2013 | Gudan et al. | |
| 2013/0286959 A1 | 10/2013 | Lou et al. | |
| 2013/0322498 A1 | 12/2013 | Maquire | |
| 2014/0044233 A1 | 2/2014 | Morton | |
| 2014/0113561 A1 | 4/2014 | Maguire | |
| 2014/0364733 A1 | 12/2014 | Huang et al. | |
| 2015/0311944 A1 | 10/2015 | Gollakota et al. | |
| 2017/0180075 A1 | 6/2017 | Gollakota et al. | |
| 2017/0180178 A1 | 6/2017 | Gollakota et al. | |

FOREIGN PATENT DOCUMENTS

| | | |
|---|---|---|
| WO | 2015123306 A1 | 8/2015 |
| WO | 2015123341 A1 | 8/2015 |
| WO | 2016100887 A2 | 6/2016 |
| WO | 2017027847 A1 | 2/2017 |
| WO | 2017132400 A1 | 8/2017 |
| WO | 2017176772 A1 | 10/2017 |

OTHER PUBLICATIONS

Analog Devices (retrieved Apr. 2016) "ADG919 RF Switch Datasheet," available online at: http://www.datasheet-pdf.com/PDF/ADG919-Datasheet-AnalogDevices-140819, Apr. 2016.
Analog Devices, Inc. (retrieved Jan. 2016) "ADG902 RF switch datasheet," available online at: http://www.analog.com/static/imported-files/data_sheets/adg901_902.pdf, Jan. 2016.
Axcera.com (retrieved Jan. 2016) "8VSB vs. COFDM," available online at: http://www.axcera.com/downloads/technotes-whitepapers/technote_4.pdf, Jan. 2016.
DiBEG (May 2014; retrieved Jan. 2016) "The Launching Country," available online at: http://www.dibeg.org/world/world.html, May 2014.
E. Inc. (retrieved Apr. 2016) "Universal software radio peripheral," available online at: http://ettus.com, Apr. 2016.
Encounternet (retrieved Jan. 2016) "The Encounternet Project," available online at: http://encounternet.net/, Jan. 2016.
Federal Communications Commission (retrieved Jan. 2016) "41 dBu service contours around ASRN 1226015, FCC TV query database," available online at: http://transition.fcc.gov/fcc-bin/tvq?list=0&facid=69571, Jan. 2016.
STMicroelectronics (Jul. 2012) "TS 881 Datasheet," 1 page, Jul. 2012.
Anthony, Sebastian, "Free energy harvesting from TV signals, to power a ubiquitous internet of things", ExtremeTech, google search, 8 pages, Jul. 8, 2013.

(56) References Cited

OTHER PUBLICATIONS

Bharadia, et al., "Full duplex backscatter", Proceedings of the 12th ACM Workshop on Hot Topics in Networks, Article No. 4, pp. 1-7, Nov. 2013.
Bharadia, et al., "Full duplex radios", Proceedings of the ACM SIGCOMM 2013 (SIGCOMM '13), pp. 375-386, Aug. 2013.
Bohorquez, et al., "A 350μW CMOS MSK transmitter and 400μW OOK super-regenerative receiver for medical implant communications", IEEE Journal of Solid-State Circuits, 44(4):1248-1259, Apr. 2009.
Buettner, "Backscatter Protocols and Energy-Efficient Computing for RF-Powered Devices", PhD Thesis, University of Washington, Seattle, WA, 144 pages, 2012, Retrieved Jan. 2016.
Buettner, et al., "Dewdrop: An energy-aware runtime for computational RFID", Proceedings of the 8th USENIX Conference on Networked Systems Design and Implementation (NSDI'11), pp. 197-210, Mar. 2011.
Buettner, et al., "RFID Sensor Networks with the Intel WISP", Proceedings of the 6th ACM Conference on Embedded Network Sensor Systems (SenSys '08), pp. 393-394, Nov. 2008.
Dayhoff, "New Policies for Part 15 Devices", Federal Communications Commission (FCC) Telecommunications Certification Body Council (TCBC) Workshop 2005, 13 pages, May 2005.
Dementyev, et al., "Wirelessly Powered Bistable Display Tags", ACM International Joint Conference on Pervasive and Ubiquitous Computing (UbiComp '13), pp. 383-386, Sep. 2013.
Dementyev, A. et al., "A Wearable UHF RFID-Based EEG System", 2013 IEEE International Conference on RFID (RFID), pp. 1-7, Apr.-May 2013.
Duarte, et al., "Full-duplex wireless communications using off-the-shelf radios: Feasibility and first results", 2010 Conference Record of the 44th Asilomar Conference on Signals, Systems and Computers (ASILOMAR), pp. 1558-1562, Nov. 2010.
Duarte, "Full-duplex Wireless: Design, Implementation and Characterization", Ph.D. thesis, Rice University, 70 pages, Apr. 2012.
Duc, et al., "Enhancing Security of EPCGlobal Gen-2 RFID against Traceability and Cloning", Auto-ID Labs Information and Communication University, Auto-ID Labs White Paper No. WP-SWNET-016, 11 pages, 2006, Retrieved Jan. 2016.
Elliott, "Average U.S. Home Now Receives a Record 118.6 TV Channels, According to Nielsen", available online at: http://www.nielsen.com/us/en/insights/pressroom/2008/average_u_s_home.html, Jun. 2008.
Gorlatova, et al., "Energy harvesting active networked tags (EnHANTs) for ubiquitous object networking", IEEE Wireless Communications, 17(6):18-25, Dec. 2010.
Guo, et al., "Virtual full-duplex wireless communication via rapid on-off-division duplex", 48th Annual Allerton Conference on Communication, Control, and Computing (Allerton), pp, 412-419, Sep.-Oct. 2010.
Jain, et al., "Practical, real-time, full duplex wireless", Proceedings of the 17th Annual International Conference on Mobile Computing and Networking (MobiCom'11) pp. 301-312, Sep. 2011.
Johnston, Scott, "Software Defined Radio Hardware Survey", Oct. 2011, 31 pgs.
Kellogg, et al., "Bringing gesture recognition to all devices", Proceedings of the 11th USENIX Conference on Network Systems Design and Implementation (NSDI'14), pp. 303-316, Apr. 2014.
Kim, et al., "Flush: a reliable bulk transport protocol for multihop wireless networks", Proceedings of the 5th International Conference on Embedded Networked Sensor Systems (SenSys '07), pp. 351-365, Nov. 2007.
Kleinrock, et al., "Packet Switching in Radio Channels: Part I—Carrier Sense Multiple-Access Modes and Their Throughput-Delay Characteristics", IEEE Transactions on Communications, 23(12):1400-1416, Dec. 1975.
Kodialam, et al., "Fast and reliable estimation schemes in RFID systems", Proceedings of the 12th Annual International Conference on Mobile Computing and Networking (MobiCom '06), pp. 322-333, Sep. 2006.

Koomey, JG et al., "Implications of Historical Trends in the Electrical Efficiency of Computing", IEEE Annals of the History of Computing, 33(3):46-54, Aug. 2011.
Kuester, et al., "Baseband Signals and Power in Load-Modulated Digital Backscatter," IEEE Antenna and Wireless Propagation Letter, vol. II, 2012, pp. 1374-1377, Nov. 2012.
Lazarus, "Remote, wireless, ambulatory monitoring of implantable pacemakers, cardioverter defibrillators, and cardiac resynchronization therapy systems: analysis of a worldwide database", Pacing and Clinical Electrophysiology, 30(Suppl 1):S2-S12, Jan. 2007.
Liang, et al., "Surviving wi-fi interference in low power zigbee networks", Proceedings of the 8th ACM Conference on Embedded Networked Sensor Systems (SenSys '10), pp. 309-322, Nov. 2010.
Liu, et al., "Ambient Backscatter: Wireless Communication Out of Thin Air" University of Washington, date retrieved Jan. 11, 2016, pp. 1-12.
Liu, et al., "Ambient Backscatter: Wireless Communication out of Thin Air", Proceedings of the Association for Computing Machinery (ACM) 2013 Conference on Special Interest Group on Data Communications (SIGCOMM), pp. 39-50, also in ACM SIGCOMM Communication Review, 43(4):39-50, Aug./Oct. 2013.
Liu, et al., "Digital Correlation Demodulator Design for RFID Reader Receiver", IEEE Wireless Communications and Networking Conference (WCNC 2007), pp. 1666-1670, Mar. 2007.
Liu, et al., "Enabling Instantaneous Feedback with Full-duplex Backscatter", Proceedings of the 20th Annual International Conference on Mobile Computing and Networking (MobiCom'14), pp. 67-78, Sep. 2014.
Mace, "Wave reflection and transmission in beams", Journal of Sound and Vibration, 97(2):237-246, Nov. 1984.
Mastrototaro, "The MiniMed Continuous Glucose Monitoring System", Diabetes Technology & Therapeutics, 2(Suppl 1):13-18, Dec. 2000.
Metcalfe, et al., "Ethernet: Distributed packet switching for local computer networks", Communications of the ACM, 19(7):395-404, Jul. 1976.
Mishra, et al., "Supporting continuous mobility through multi-rate wireless packetization", Proceedings of the 9th Workshop on Mobile Computing Systems and Applications (HotMobile '08), pp. 33-37, Feb. 2008.
Mutti, et al., "CDMA-based RFID Systems in Dense Scenarios: Concepts and Challenges", 2008 IEEE International Conference on RFID, pp. 215-222, Apr. 2008.
Nikitin, et al., "Passive tag-to-tag communication", 2012 IEEE International Conference on RFID (RFID), pp. 177-184, Apr. 2012.
Nikitin, et al., "Theory and measurement of backscattering from RFID tags", IEEE Antennas and Propagation Magazine, 48(6):212-218, Dec. 2006.
Obeid, et al., "Evaluation of spike-detection algorithms for a brain-machine interface application", IEEE Transactions on Biomedical Engineering, 51(6):905-911, Jun. 2004.
Occhiuzzi, et al., "Modeling, Design and Experimentation of Wearable RFID Sensor Tag", IEEE Transactions on Antennas and Propagation, 58(8):2490-2498, Aug. 2010.
Pandey, et al., "A Sub-100 μW MICS/ISM Band Transmitter Based on Injection-Locking and Frequency Multiplication", IEEE Journal of Solid-State Circuits, 46(5):1049-1058, May 2011.
Parks, et al., "A wireless sensing platform utilizing ambient RF energy", 2013 IEEE Topical Conference on Biomedical Wireless Technologies, Networks, and Sensing Systems (BioWireleSS), pp. 154-156, Jan. 2013.
Parks, Aaron N. et al., "Turbocharging Ambient Backscatter Communication", SIGCOMM, Aug. 2014, 1-12.
Pillai, et al., "An Ultra-Low-Power Long Range Battery/Passive RFID Tag for UHF and Microwave Bands With a Current Consumption of 700 nA at 1.5 V", IEEE Transactions on Circuits and Systems I: Regular Papers, 54(7):1500-1512, Jul. 2007.
Qing, et al., "A folded dipole antenna for RFID", IEEE Antennas and Propagation Society International Symposium, 1:97-100, Jun. 2004.

(56) References Cited

OTHER PUBLICATIONS

Rabaey, et al., "PicoRadios for wireless sensor networks: the next challenge in ultra-low power design", 2002 IEEE International Solid-State Circuits Conference, Digest of Technical Papers (ISSCC), 1:200-201, Feb. 2002.

Ransford, et al., "Mementos: system support for long-running computation on RFID-scale devices", ACM SIGPLAN Notices—Proceedings of the 16th International Conference on Architecturla Support for Programming Languages and Operating Systems (ASPLOS '11), 46(3):159-170, Mar. 2011.

Rao, KVS et al., "Antenna design for UHF RFID tags: a review and a practical application", IEEE Transactions on Antennas and Propagation, 53(12):3870-3876, Dec. 2005.

Roy, et al., "RFID: From Supply Chains to Sensor Nets", Proceedings of the IEEE, 98(9):1583-1592, Jul. 2010.

Sample, et al., "Design of an RFID-Based Battery-Free Programmable Sensing Platform", IEEE Transactions on Instrumentation and Measurement, 57(11):2608-2615, Nov. 2008.

Sample, et al., "Experimental results with two wireless power transfer systems", IEEE Radio and Wireless Symposium (RAWCON), pp. 16-18, Jan. 2009.

Seigneuret, et al., "Auto-tuning in passive UHF RFID tags", 2010 8th IEEE International NEWCAS Conference (NEWCAS), pp. 181-184, Jun. 2010.

Sen, et al., "CSMA/CN: Carrier sense multiple access with collision notification", Proceedings of the 16th Annual International Conference on Mobile Computing and Networking (MobiCom'10), pp. 25-36, Sep. 2010.

Smith, Jr et al., "A wirelessly-powered platform for sensing and computation", ACM International Joint Conference on Pervasive and Ubiquitous Computing (UbiComp 2006), 4206:495-506, Sep. 2006.

So, et al., "Multi-channel mac for ad hoc networks; handling multi-channel hidden terminals using a single transceiver", Proceedings of the 5th ACM International Symposium on Mobile Ad Hoc Networking and Computing, pp. 222-233, May 2004.

Srinivasan, et al., "An empirical study of low-power wireless", ACM Transactions on Sensor Networks (TOSN), vol. 6, Issue 2, Article No. 16, Feb. 2010.

Thomas, et al., "A 96 Mbit/sec, 15.5 pJ/bit 16-QAM modulator for UHF backscatter communication", 2012 IEEE International Conference on RFID (RFID), IEEE RFID Virtual Journal, pp. 185-190, Apr. 2012.

Tubaishat, et al., "Sensor networks: an overview", IEEE Potentials, 22(2):20-23, Apr.-May 2003.

Walden, "Analog-to-digital converter survey and analysis", IEEE Journal on Selected Areas in Communications, 17(4):539-550, Apr. 1999.

Welbourne, et al., "Building the Internet of Things Using RFID: The RFID Ecosystem Experience", IEEE Internet Computing, 13(3):48-55, May-Jun. 2009.

Wuu, et al., "Zero-Collision RFID Tags Identification Based on CDMA", 5th International Conference on Information Assurance and Security (IAS '09), pp. 513-516, Aug. 2009.

Yi, et al., "Analysis and Design Strategy of UHF Micro-Power CMOS Rectifiers for Micro-Sensor and RFID Applications", IEEE Transactions on Circuits and Systems I: Regular Papers, 54(1):153-166, Jan. 2007.

Zalesky, et al., "Integrating segmented electronic paper displays into consumer electronic devices", 2011 IEEE International Conference on Consumer Electronics (ICCE), pp. 531-532, Jan. 2011.

Zhang, et al., "Frame retransmissions considered harmful: improving spectrum efficiency using micro-ACKs", Proceedings of the 18th Annual International Conference on Mobile Computing and Networking (MobiCom '12), pp. 89-100, Aug. 2012.

International Search and Written Opinion received for PCT/US2015/066820 dated Feb. 23, 2016.

U.S. Appl. No. 15/601,836, entitled "Ambient Backscatter Tranceivers, Apparatuses, Systems, and Methods for Communicating Using Backscatter of Ambient RF Signals", filed May 22, 2017.

Unpublished PCT Application No. PCT/US2017/057207, entitled "Backscatter Systems, Devices, and Techniques Utilizing CSS Modulation and/or Higher Order Harmonic Cancellation," filed Oct. 18, 2017, pp. all.

U.S. Appl. No. 15/752,214 entitled 'Backscatter Devices and Network Systems Incorporating Backscatter Devices' filed on Feb. 12, 2018, pp. all.

\* cited by examiner

DEVICES AND METHODS FOR BACKSCATTER COMMUNICATION USING ONE OR MORE WIRELESS COMMUNICATION PROTOCOLS INCLUDING BLUETOOTH LOW ENERGY EXAMPLES

CROSS-REFERENCE TO RELATED APPLICATIONS

This application is a continuation-in-part of International Application PCT/US2015/066820, filed Dec. 18, 2015 (the '820 application). The instant application also claims the benefit under 35 U.S.C. 119 of the earlier-filed provisional application 62/210,900, filed Aug. 27, 2015. The '820 application claims the benefit under 35 U.S.C. 119 of earlier-filed provisional applications 62/094,277, filed Dec. 19, 2014 and 62/107,149 filed Jan. 23, 2015. The '820 application and all three earlier-filed provisional applications are hereby incorporated by reference in their entirety for any purpose.

TECHNICAL FIELD

Examples described herein are directed generally to wireless data transmission. In particular, examples are described that transmit data wirelessly by backscattering a signal such that the backscattered signal is compatible with a wireless communication protocol utilized by a receiving device.

BACKGROUND

Wireless communication devices generally transmit information by generating a radiofrequency carrier using a circuit such as an oscillator, and modulating information onto the carrier wave using amplitude modulation, frequency modulation, phase modulation, quadrature amplitude modulation (QAM) or other techniques including a combination of the aforementioned modulation types. Multiple such modulated signals may be combined to form more complex schemes such as orthogonal frequency division multiplexing (OFDM). The carrier is usually a sinusoidal voltage at a radio frequency; that is a frequency at which energy may be propagated in the form of an electromagnetic wave by connecting the sinusoidal voltage to an antenna. The modulation process modifies the amplitude, frequency, and/or phase of the carrier in a time varying manner to convey information. Examples of conventional wireless communication devices include analog communication systems such as analog AM and FM broadcast radio as well as digital communication systems such as the widely used Wi-Fi (e.g. IEEE 802.11) and Bluetooth data communication standards as well as digital television (e.g. DTV) and digital broadcast radio standards.

Generally, conventional wireless communication devices have radiofrequency carrier generation and the modulation processes carried out in a single device or installation of interconnected devices.

In contrast, backscatter devices generally refer to an alternative communication method where carrier generation and modulation are performed in separate devices. For example, a carrier frequency may be generated in a first device that emits an electromagnetic carrier wave. A second device carries out the modulation process by scattering or reflecting the carrier wave, thus affecting the amplitude, frequency, and/or phase of the carrier emitted by the first device. This can be achieved by modulated scattering; that is by selective reflection of the incident carrier wave by means of a modulator circuit. Backscatter devices, requiring a modulator which may be a simple as a transistor, may be quite simple and low power.

Backscatter communication is widely used in ultra-high frequency RFID systems. By using modulated backscatter to communicate, RFID tags are power efficient compared to alternative approaches using conventional wireless communication schemes. However, RFID tags require a specialized reader or receiver hardware to receive the backscattered signal. RFID readers, for example, are complex devices which include a transmitter circuit, which performs the carrier wave generation process, along with a receiver circuit, which receives the modulated backscatter signal and extracts the data transmitted by the RFID tag. This specialized hardware presents a cost and complexity burden to users of the RFID system, in that RFID readers must be purchased, installed, and maintained on a data communication network to take advantage of the RFID tags.

SUMMARY

Example devices are described herein. An example device may include an antenna configured to receive an incident signal having a carrier frequency. The device may further include a modulator and a symbol generator. The symbol generator may be configured to provide a subcarrier frequency. The symbol generator may further be configured to control the modulator to backscatter the incident signal having the carrier frequency using the subcarrier frequency to provide a backscattered signal to the antenna. The backscattered signal may include a bandpass signal in a predetermined frequency range.

In some examples, the predetermined frequency range is a range specified by a wireless communication standard.

In some examples, the predetermined frequency range is a range of an advertising channel specified by a Bluetooth Low Energy specification.

In some examples, the symbol generator may be configured to provide the backscattered signal in part by mixing the subcarrier frequency with the carrier frequency.

In some examples, the symbol generator may be configured to provide the backscattered signal in part by mixing a harmonic of the subcarrier frequency with the carrier frequency.

In some examples, the modulator may include a field effect transistor.

In some examples, the backscattered signal may include a packet. In some examples, the packet may include a preamble, an access address, a payload data unit, and a cyclic redundancy check.

In some examples, the device may further include a frequency source coupled to the symbol generator. The frequency source may be configured to provide the subcarrier frequency. In some examples, the device may include multiple frequency sources coupled to the symbol generator. The symbol generator may be configured to select at least one of the multiple frequency sources for use in providing the backscattered signal. The symbol generator may be configured to select at least one of the multiple frequency sources in accordance with data provided to the symbol generator. In some examples, at least one of the multiple frequency sources is modulated in amplitude, frequency, and/or phase.

In some examples, the subcarrier frequency may be modulated in amplitude, frequency, and/or phase.

In some examples, the backscattered signal may be an orthogonal frequency division multiplex (OFDM) signal.

In some examples, the incident signal may include a data-carrying signal. In some examples, the incident signal may include a signal arranged in accordance with a wireless communication protocol. In some examples, the incident signal may include a Bluetooth signal and in some examples the backscattered signal may include a Bluetooth advertising packet. In other examples, the incident signal may include a WiFi signal. In further examples, the backscattered signal may include a WiFi signal such as a beacon frame. In some examples, the incident signal may include a Zigbee or IEEE 802.15.4 signal. In some examples, the backscattered signal may include a Zigbee or IEEE 802.15.4 beacon frame.

Examples of methods are described herein. An example method may include receiving an incident signal having a carrier frequency. The method may include backscattering the incident signal to provide a backscattered signal. The backscattering may include modulating, using a backscatter device, impedance presented to at least one antenna in accordance with data to be provided in the backscattered signal, and mixing the carrier frequency with at least one subcarrier provided by the backscatter device.

In some examples, the mixing may result in a bandpass signal having a predetermined frequency range. In some examples, the predetermined frequency range may include a range of a channel in accordance with a wireless communication standard. In some examples, the wireless communication standard comprises Bluetooth Low Energy.

In some examples, modulating include modulating the amplitude, frequency, and/or phase of the backscattered signal in a pattern indicative of the data to be provided in the backscattered signal.

In some examples, the data to be provided in the backscattered signal includes a packet having a preamble, an access address, a payload data unit, and a cyclic redundancy check.

In some examples, a method further includes transmitting the backscattered signal.

In some examples, the backscattered signal includes a reading of a sensor associated with a device providing the backscattered signal.

In some examples, the backscattered signal may include an identification of an asset associated with a device providing the backscattered signal.

In some examples, the device providing the backscattered signal includes a tag.

In some examples, the incident signal may include a data-carrying signal. In some examples, the incident signal may include a signal arranged in accordance with a wireless communication protocol. In some examples, the incident signal may include a Bluetooth signal and in some examples the backscattered signal may include a Bluetooth advertising packet. In other examples, the incident signal may include a WiFi signal. In further examples, the backscattered signal may include a WiFi signal such as a beacon frame. In some examples, the incident signal may include a Zigbee or IEEE 802.15.4 signal. In further examples, the backscattered signal may include a Zigbee or IEEE 802.15.4 beacon frame.

Examples of systems are described herein. An example system may include a signal source configured to provide an incident signal, a backscatter device configured to provide a backscattered signal, and a wireless communication device configured to receive the backscattered signal. The backscatter device may include an antenna configured to receive the incident signal having a carrier frequency, a modulator, and a symbol generator. The symbol generator may be configured to provide a subcarrier frequency, and the symbol generator may be further configured to control the modulator to backscatter the incident signal having the carrier frequency using the subcarrier frequency to provide a backscattered signal, the backscattered signal including a bandpass signal in a predetermined frequency range and/or channel. The wireless communication device may be configured to receive the backscattered signal using components also used to receive communication signals which are not backscattered.

In some examples, the wireless communication device and the signal source are wholly or partially integrated into a same device.

In some examples, the same device is configured to operate in a full duplex mode for transmission of the incident signal in one channel and receipt of the backscattered signal in a second channel different from the one channel.

In some examples, the wireless communication device and the signal source are separate devices.

In some examples, the backscatter device may include a receiver.

In some examples, the incident signal has an incident signal duration and a duration of the backscattered signal may be less than the incident signal duration such that the backscattered signal is provided by the backscatter device during a time the incident signal is present. In some examples, the presence of the incident signal may be detected by a receiver of the backscatter device to determine a time to provide the backscatter signal (e.g. while the incident signal is present). In some examples, the backscatter signal may be provided at a time indicated by a deterministic or a randomized timer.

In some examples, the incident signal and the backscattered signal are each formatted in accordance with a wireless communication protocol. In some examples, the incident signal and the backscatter signal have the same wireless communication protocol. In further examples, the incident signal and the backscatter signal have different wireless communication protocols.

DETAILED DESCRIPTION

Certain details are set forth below to provide a sufficient understanding of embodiments of the disclosure. However, it will be clear to one skilled in the art that embodiments of the disclosure may be practiced without various of these particular details. In some instances, well-known device components, circuits, control signals, timing protocols, and software operations have not been shown in detail in order to avoid unnecessarily obscuring the described embodiments of the disclosure.

Examples described herein include backscatter devices (e.g. transmitters or transceivers) that utilize backscattered signals to communicate with each other and/or other devices in accordance with established wireless communication protocols. For example, a system may include a backscatter device that is configured to transmit data by modulating a backscattered version of an incident signal and mixing the carrier frequency of the incident signal with a subcarrier frequency such that a resulting backscatter signal includes a bandpass signal having a predetermined frequency range. The predetermined frequency range may, for example, be a frequency range specified by a wireless communication protocol, such as Bluetooth Low Energy (BLE), sometimes called Bluetooth Smart. Other wireless communication protocols such as WiFi (IEEE 802.11), Zigbee, IEEE 802.15.4, etc. may also be used. Examples described herein may accordingly include systems, devices and methods for providing backscatter signals which may have the same characteristics as conventional wireless communication signals, allowing conventional wireless devices to receive backscattered signals instead of restricting backscatter communications to specialized readers in some examples. Accordingly, wireless communication devices may receive examples of backscattered signals described herein using the same components (e.g. chipsets, other hardware, software, or combinations thereof) used to receive communication signals which may not be backscattered signals.

Figure 1:
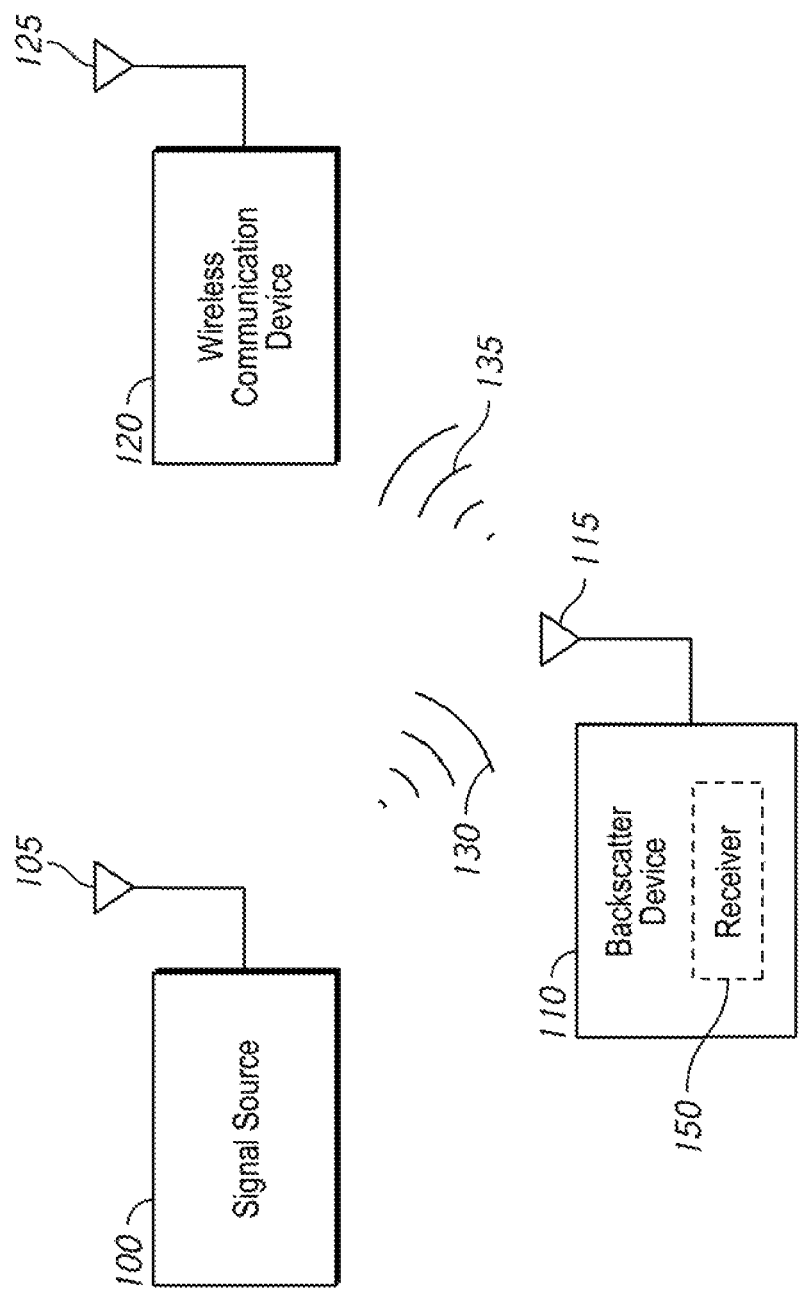
FIG. 1 is a schematic block diagram of a system including a backscatter device in accordance with examples described herein.

FIG. 1 is a schematic block diagram of a system including a backscatter device in accordance with examples described herein. The system may include a signal source 100, which may be configured to provide a signal 130 using antenna 105. The system may include a backscatter device 110 which may be configured to receive the signal 130 using the antenna 115 and modulate a backscattered version of the signal 130 to provide a transmitted backscatter signal 135 (e.g. backscattered signal) using the antenna 115. The system may further include a wireless communication device 120 that may receive the transmitted backscatter signal 135 using an antenna 125. The transmitted backscatter signal 135 may be constructed in accordance with established wireless communication protocols, such that the wireless communication device 120 may receive and decode the transmitted backscatter signal 135 without a need for custom programming (e.g., firmware, software) or hardware specific to communication with the backscatter device 110.

The signal source 100 may generally be any device that is capable of transmitting a suitable signal 130 for backscatter by the backscatter device 110. Generally, the signal 130 may be a radio frequency signal, such as a wireless communication signal. The signal 130 may have a carrier frequency (e.g. a frequency of a carrier wave that may be modulated with an input signal to provide data in the signal 130). The signal 130 may generally be implemented using any signals which may be received and backscattered by backscatter devices described herein. The signal 130 may be implemented using an RF signal including a wireless communication signal.

Examples of signals used to implement the signal 130 include, but are not limited to, television transmission signals, radio transmission signals, cellular communication signals, Bluetooth signals, Wi-Fi (e.g. IEEE 802.11), Zigbee, and IEEE 802.15.4 signals. Devices which may be used to implement the signal source 100 include but are not limited to television transmitters, base stations including cellular base stations, AM or FM broadcast stations, digital radio stations, radar, Wi-Fi (e.g. IEEE 802.11) access points, Bluetooth devices, mobile devices, telephones (including cellular telephones), computers, routers, appliances, transceivers, tablets, and watches. In some examples the signal source 100 may be terrestrial while in other examples the signal source 100 may be located on an aircraft, satellite or spacecraft. It should be understood that any externally (e.g. external to the backscatter device 110) generated carrier having at least one frequency component in the frequency range of interest (sometimes referred to as $F_{carrier}$) may be employed. In some examples, the signal source 100 may supply at least a portion of the operating power for the backscatter device 110. In some examples, backscatter device 110 may include an RF energy harvesting circuit to extract all or portions of its operating power from the signal 130 (and/or other environmental signals).

The signal 130 may be present in the environment from signal sources already present in an environment, and/or the signal 130 may be provided by a signal source placed in an environment for the purpose of providing a signal to the backscatter device 110. While shown as having one antenna 105 the signal source 100 may be implemented having any number of antennas, including a phased array antenna, or a multiple-input-multiple-output (MIMO) array of antennas. In some examples, the signal 130 may itself be a data-carrying signal which may itself be arranged in accordance with a wireless communication protocol (e.g. a Bluetooth signal and/or Bluetooth Low Energy (BLE) signal, or a WiFi 802.11 signal).

The signal source 100 may include a frequency source, such as an oscillator or frequency synthesizer, which may supply radio frequency energy to the antenna 105, in some examples via a power amplifier included in the signal source 100. The frequency source may include one or more of a fixed frequency source, a frequency hopping source, or a direct sequence spread spectrum source. It may be powered by batteries, by an AC power source, or by energy harvested from its environment (such as via a solar cell or a thermal or vibrational energy harvester). The signal source 100 (e.g. a transmitter) may be fixed in location or it may be mobile, as in a handheld or vehicle mounted application.

In some examples the signal source 100 may include and/or be co-located with a receiver connected to the same antenna 105 or antenna array. In some examples the signal source 100 may be implemented using an RFID reader.

The backscatter device 110 may be implemented, for example, using a tag. In some examples, the backscatter device 110 may be implemented using a device for which low power communication is desirable, such as a tag, sensor node, or the like. Tags implementing the backscatter device 110 may be associated with (e.g. placed on and/or proximate to) any of a variety of items to provide information about the items. Such items include, but are not limited to, appliances, food storage containers, inventory items such as personal electronics, and portions of a building. While shown as having one antenna 115, the backscatter device 110 may utilize any number of antennas in some examples.

The backscatter device 110 may modulate a backscattered version of the signal 130 from the signal source 100 to provide a transmitted backscatter signal 135 encoded with data to the wireless communication device 120. The transmitted backscatter signal 135 may be formatted in accordance with predetermined wireless communication standards, such as but not limited to the Bluetooth Low Energy (also called Bluetooth Smart) standard. There are many different wireless communication standards, each of which may have a specified frequency plan, modulation scheme, and packet data format, among other specified parameters. A conventional wireless communication standard may be used in some examples, at least owing to the ease with which the backscattered signal may be received and decoded by existing devices. For example, BLE devices may be widely deployed in smart phones, tablets, PCs, and other devices from major manufacturers such as Apple and Samsung. These companies have adopted the Bluetooth 4.0 standard including the BLE mode of operation which was generally created to accommodate low energy applications. One driver for this technology has been the demand for beacons, such as the Apple iBeacon, which may provide location awareness to iOS devices. In some examples, several BLE features may be leveraged in examples described herein. Sensor ID and data may be transferred in broadcast "advertising packets", without requiring acknowledgements. Also, the three advertising channels defined in the BLE spec use a fixed modulation scheme (Gaussian-shaped binary FSK at 1 Mbps), in three fixed frequency channels centered on 2402 MHz, 2426 MHz, and 2480 MHz. Also, every BLE receiver listens for incoming advertising packets across all three advertising channels, so reception of advertising packets on any one channel is sufficient for the message to be received. These features of BLE may be leveraged by systems, devices, and methods described herein to provide backscattered communication. In other examples, the beacon frames of wireless communication standards such as WiFi, IEEE 802.11, Zigbee, IEEE 802.15.4, or other communication standards may be used analogously to the "advertising packets" of the BLE spec.

Data encoded in the transmitted backscatter signal 130 by the backscatter device 100 may, for example, be related to data received from a sensor or an input, or may be related to an identity or parameter of an item with which the backscatter device 110 is associated (e.g. temperature in a portion of a building, identity of an inventory item, temperature of a food storage container, a biological or physiological signal including measurement of a parameter relevant to human or animal health such as heart rate, blood pressure, body chemistry such as oxygen level, glucose level, the level of another analyte, or neural data such neural recording data or muscle activity such as electromyelogram or EMG data).

Backscatter communication generally includes modulating the reflection of an incident signal at an antenna, rather than generating the signal itself. The signal 130 used by the backscatter device 110 may include a signal having a carrier frequency that is provided by the signal source 100 for another purpose, such as a television broadcast or cellular communication between a base station and a mobile device, or transmission between an access point and a mobile device, or transmissions between two mobile devices using one or more of the aforementioned wireless communication protocols. In some examples, the transmitted backscatter signal 135 may be encoded with data using a modulation scheme. To generate the backscattered signal, the backscatter device 110 may modulate the impedance of one or more antennas, such as the antenna 115, to alternate between two or more discrete states, e.g., including in some embodiments reflecting and not-reflecting. The reflecting state of the antenna 115 may provide a reflection of the signal 130, and the non-reflecting state may not reflect the signal 130. Thus, the backscatter device 110 may indicate either a '0' or a '1' bit by switching the state of the antenna 115 between the reflecting and non-reflecting states.

Switching the state of the antenna 115 of the backscatter device 110 may include adjusting an impedance of a load attached to the terminals of the antenna 115. The magnitude and/or phase of the scattered signal from the antenna 115 is typically determined by the difference in the impedance values of the load attached to the terminals of the antenna 115. By modulating the electrical impedance presented to the antenna 115, the magnitude and/or phase of incident energy that is scattered is modulated, thus enabling information to be transmitted. For example, in a first state, the antenna 115 may have a first impedance (e.g., a short circuit) to a reference node and may reflect the signal 130 to provide a transmitted backscatter signal 135 that has a first signal magnitude and phase. In a second state, the antenna 115 may have a second impedance (e.g., an open circuit) to the reference node, and may reflect the signal 130 to provide a backscatter signal 135 that has a second signal magnitude and phase. The first magnitude may be greater or less than the second magnitude. This yields an amplitude shift keying (ASK) backscattered signal in some examples. In some examples, the backscattered signal may differ primarily in phase between the first state and the second state. This yields a phase shift keying (PSK) backscattered signal. It should be understood that more than two magnitude states may be employed, thus yielding a pulse amplitude modulated (PAM) backscattered signal. It should further be understood that more than two phase states, such as M states, may be employed, thus yielding an M-ary PSK backscattered signal. In some examples, the impedances of the loads attached to the terminals of the antenna are chosen to affect both the magnitude and the phase of the backscattered signals in each of several states. In such embodiments, a quadrature amplitude modulation (QAM) backscattered signal may be produced.

By opening and closing the modulating switch in a time varying pattern, the scattering or reflectivity will be time varying, and thus information may be conveyed by the scattered or reflected signal. In some embodiments, the modulating switch is opened and closed once for each transmitted symbol. The rate of this time varying pattern may then be referred to as the symbol rate of the backscattered signal. The symbol rate is the rate at which the modulator changes its impedance state to convey different pieces of information (e.g. groups of one or more bits). It should be understood that circuits or structures other than a switch may be used to change the impedance state of the load connected to the antenna 115. Such devices as a PIN diode, a varactor diode, a field effect transistor, a bipolar transistor, or circuit combinations of these elements may also be used to change the impedance state of the load connected to antenna 115.

The backscatter device 110 may include a modulator that may function to modulate the backscatter of the signal 130, e.g. to switch an impedance of the load attached to antenna 115 from a non-reflecting to a reflecting state. The backscatter device 110 may also provide a subcarrier frequency. In some examples, the subcarrier frequency may be provided, for example, by an oscillator. The switching or modulating action of the backscatter device 110 may mix the subcarrier frequency with the carrier frequency of the signal 130 to adjust a frequency component of the transmitted backscatter signal 135. In this manner, the transmitted backscatter signal 135 may include a bandpass signal component having a predetermined frequency range, for example a frequency range specified by a wireless communication standard.

Examples of backscatter devices described herein, including the backscatter device 110 of FIG. 1, may have parameters selected to produce frequency components corresponding to at least one band-pass signal in the frequency spectrum of the scattered or reflected signal. These frequency components may be select to be compatible with a band-pass signal expected by a wireless communication device (e.g. the wireless communication device 120 of FIG. 1) such that the wireless communication device will accept and properly decode the transmitted backscattered signal. The transmitted backscattered signal may contain other frequency components that are outside of the desired band-pass signal but these components may be out-of-band with respect to the communication signal and thus discarded by the wireless communication device 120.

In some examples, the backscatter device 110 may include a receiver 150. The receiver 150 may be used to detect a presence of the signal 130. In some examples, the receiver 150 may detect energy related to the presence of the signal 130. In some examples, the receiver 150 may decode all or a portion of the signal 130. For example, the receiver 150 may obtain an expected duration of the signal 130 by decoding at least a portion of the incident signal. The receiver 150 may be utilized by the backscatter device 110 to determine when to provide the backscatter signal 135. For example, the backscatter device 110 may provide the backscatter signal 135 during a time the signal 130 is incident on the backscatter device 110. Accordingly, in some examples, the backscatter device 110 may select a time at which to begin backscattering based on a signal from the receiver 150 indicative of signal 130 being incident on the backscatter device 110. In some examples, backscatter device 110 may select a time at which to stop backscattering based on a signal from the receiver 150 indicative of signal 130 being absent and/or signal 130 being a predetermined time away from ending (e.g. when a marker indicative of an end of the signal 130 is received by the receiver 150).

The wireless communication device 120 may receive the transmitted backscatter signal 135 at the antenna 125. While one antenna 125 is shown, multiple antennas may also be used. The wireless communication device 120 may be implemented using any device capable of wireless communication, including but not limited to, a cellular telephone, computer, server, router, laptop, tablet, wearable device, watch, appliance, automobile, or airplane. The wireless communication device 120 may be configured to (e.g. include hardware and/or firmware and software for) communicate using a particular protocol for a wireless communication signal (e.g. Bluetooth Low Energy, Bluetooth Smart, Wi-Fi, CDMA, TDMA). The backscatter device 110 may provide a transmitted backscatter signal 135 formatted in accordance with the wireless communication protocol expected by the wireless communication device 120. For example, the backscatter signal 135 may be a Bluetooth signal (e.g. such as an advertising packet), a Wi-Fi signal (e.g. such as a beacon frame), and/or a ZigBee signal. For example, the backscatter signal 135 may be a IEEE 802.15.4 beacon frame. In this manner, no further software, firmware, or hardware may be required for the wireless communication device 120 to receive and decode the transmitted backscatter signal 135 than is required for the wireless communication device 120 to receive and decode received signals from other sources that are formatted in accordance with the wireless communication protocol.

The wireless communication device 120 may employ a frequency shift keying (FSK) or Gaussian frequency shift keying (GFSK) standard having at least one or more specified frequency deviations, one or more specified channel center frequencies, and one or more specified symbol rates. In some examples, the aforementioned FSK or GFSK standard is that of the Bluetooth Low Energy specification as defined by the Bluetooth Special Interest Group (SIG). Accordingly, in some examples the backscatter device 110 may provide a transmitted backscatter signal 135 compatible with the FSK or GFSK standard employed by the wireless communication device 120. In some examples, features of the BLE specification (e.g. the use of broadcast packets on advertising channels) may be used by systems described herein such that example backscatter devices may provide backscattered signals that can be received by unmodified BLE devices. From the point of view of the BLE receivers the backscattered signals may be indistinguishable from conventional BLE transmissions. The backscatter devices may use either a continuous wave signal or a data-carrying signal (e.g. a BLE signal) in the environment as a carrier signal to generate a binary FSK backscattered signal. In some examples, the backscattered signal may have a data rate of 1 Mbps and may be received as a BLE advertising packet. In some examples, a dateless signal in the (e.g. a CW source) and an information carrying signal in the form of a BLE messages may be modified to contain a BLE advertising packet specified by the backscatter device. The mixing products produced by backscatter techniques described herein may allow for fundamental mode and harmonic mode creation of BLE messages.

The wireless communication device 120 may employ a phase shift keying (PSK) standard. Accordingly, in some examples the backscatter device 110 may provide a transmitted backscatter signal 135 compatible with the PSK standard. It should be appreciated that the PSK signal so generated may use two distinct phases to encode a symbol or a bit, or it may alternatively have more than two distinct phases to encode a symbol or a group of bits as in M-ary PSK.

The wireless communication device 120 may employ an amplitude shift keying (ASK) standard. Accordingly, in some examples the backscatter device 110 may provide a transmitted backscatter signal 135 compatible with the ASK standard. It should be appreciated that the ASK signal so generated may use two distinct amplitudes to encode a symbol or a bit, or it may alternatively have more than two distinct amplitudes to encode a symbol or a group of bits as in pulse amplitude modulation (PAM).

The wireless communication device 120 may employ a quadrature amplitude modulation (QAM) standard. Accordingly, in some examples the backscatter device 110 may provide a transmitted backscatter signal 135 compatible with the QAM standard. It should be appreciated that the QAM signal may have more than two distinct amplitudes and phase combinations to encode a symbol or a group of bits, as in M-ary QAM.

The wireless communication device 120 may employ an orthogonal frequency division multiplexing (OFDM) standard and/or technique. Accordingly, in some examples the backscatter device 110 may provide a transmitted backscatter signal 135 compatible with the OFDM standard and/or technique. This may be achieved by modulating the backscatter signal 135 with more than one subcarrier frequency at the same time. Each subcarrier may in turn be modulated with ASK, PAM, PSK, or QAM to form the OFDM backscattered signal.

In some examples, the wireless communication device 120 and the signal source 100 may be separate devices (as shown in FIG. 1). In some examples, the wireless communication device 120 (e.g. the device that may receive the backscattered signal) and the signal source 100 (e.g. the device that may provide an incident signal for backscattering) may be wholly or partially integrated into a same device. For example, a device may be used including circuitry having a full duplex mode for transmission in one channel (e.g. a channel in which a signal source may transmit a signal for backscattering by the backscatter device 110) and receiving in another channel (e.g. a channel in which a backscattered signal is provided from the backscatter device 110).

In some examples, the signal source 100 may provide a wireless communication signal formatted in accordance with a wireless communication protocol (e.g. a Bluetooth and/or BLE signal, a WiFi signal, a ZigBee signal, or combinations thereof). The wireless communication device 120 may receive both the wireless communication signal from the signal source 100 and the backscattered signal from the backscatter device 110.

While FIG. 1 depicts one backscatter device 110, the system may include more than one backscatter device, and multiple backscatter devices may be in communication with the wireless communication device 120 using signals backscattered from the signal source 100. Moreover, while FIG. 1 depicts one signal source 100, in some examples, the system may include more than one signal source.

In some examples, multiple backscatter devices may simultaneously (e.g. wholly and/or partially simultaneously) backscatter the signal 130 from a signal source 100 to form multiple backscatter signals in multiple channels corresponding to the channels of a single wireless communication protocol or standard. In some examples, multiple backscatter devices may simultaneously (e.g. wholly and/or partially simultaneously) backscatter the signal 130 from a signal source 100 to form multiple backscatter signals in multiple channels corresponding to the channels of multiple wireless communication protocols or standards.

In some examples, multiple backscatter devices may sequentially backscatter the signal 130 from a signal source 100 to form multiple backscatter signals occupying multiple channels at different times. In some examples, a single backscatter device may employ its symbol generator (e.g. symbol generator 230 of FIG. 2) to generate multiple simultaneous backscatter signals in multiple channels at the same time.

In some examples, communication between a signal source 100 and a wireless communication device 120 may be conducted simultaneously (e.g. wholly and/or partially simultaneously) with a backscatter signal generated by the backscatter device 110. The backscatter signal 135 generated by the backscatter device 110 may be received either by the depicted wireless communication device 120 or by another wireless communication device implementing either the same or a different wireless communication standard as that used by signal source 100.

Figure 2:
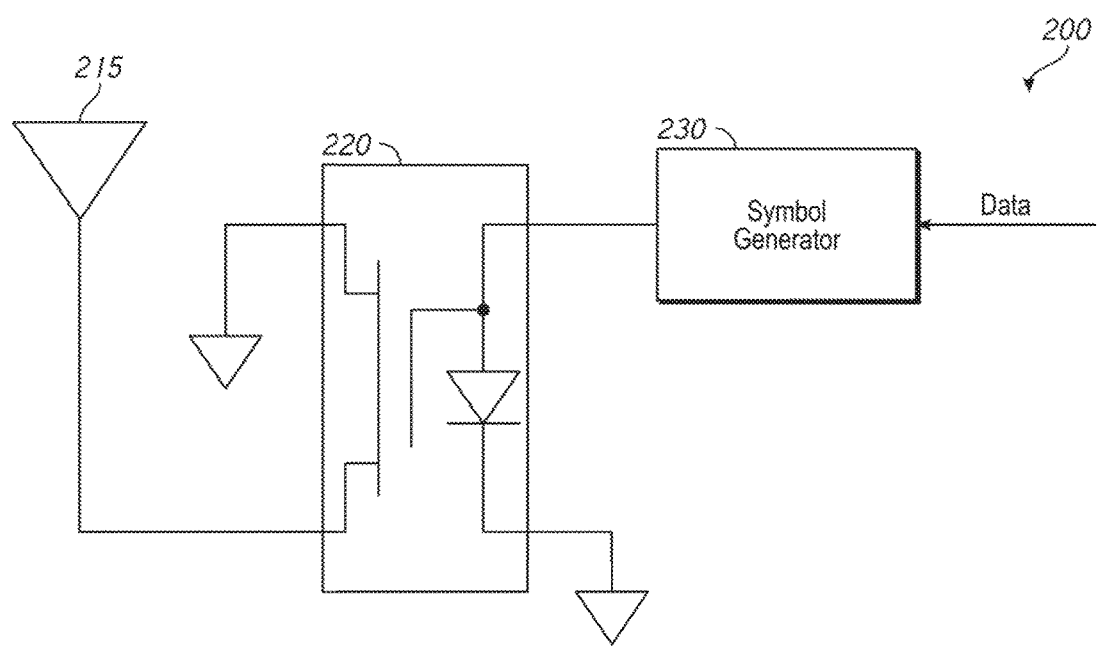
FIG. 2 is a schematic illustration of a backscatter device in accordance with examples described herein.

FIG. 2 is a schematic illustration of a backscatter device in accordance with examples described herein. The backscatter device 200 may be used, for example to implement the backscatter device 110 of FIG. 1. The backscatter device 200 includes an antenna 215, a modulator 220, and a symbol generator 230. The modulator 220 may modulate an impedance of the antenna 215 to change the magnitude and/or phase of an incident signal, e.g. the signal 130 of FIG. 1.

The antenna 215 may be used to implement the antenna 115 of FIG. 1 in some examples. The antenna 215, during operation, may receive an incident signal having a carrier frequency, such as the signal 130 of FIG. 1. The antenna 215 may further transmit a transmitted backscattered signal, e.g. the backscatter signal 135 of FIG. 1, by reflecting and/or absorbing portions of the signal 130 as controlled by the modulator 220 and symbol generator 230. The reflected and/or absorbed portions of the signal 130 may be modulated in combinations of amplitude and phase, and subcarrier frequency and phase as described herein, for example.

The modulator 220 may generally be implemented using any device capable of modulating an impedance of the antenna 215 in accordance with a control signal provided by the symbol generator 230. The modulator 220 is shown in FIG. 2 implemented using a single field effect transistor. The gate of the field effect transistor may be coupled to the symbol generator 230 and receive a control signal from the symbol generator 230 based on the data to be encoded into the backscatter signal. Other devices may be used to implement the modulator 220 in other examples. Such devices as a PIN diode, a varactor diode, a field effect transistor, a bipolar transistor, or circuit combinations of these elements may also be used to change the impedance state of the modulator 220, and thus change the impedance of the load connected to antenna 215.

The symbol generator 230 may provide at least one subcarrier frequency. In some examples, only one subcarrier frequency may be provided by the symbol generator 230. In some examples, multiple subcarrier frequencies may be provided. The symbol generator 230 may provide the subcarrier frequency, for example, by having a frequency source that provides the subcarrier frequency. For example, the symbol generator may have one or more oscillators that may oscillate at the subcarrier frequency or sub-harmonics thereof. In some examples, the symbol generator may have multiple frequency sources coupled to and/or included in the symbol generator and the symbol generator may select one of the multiple frequency sources for use in providing the backscattered signal. The symbol generator may select one of the multiple frequency sources in accordance with data provided to the symbol generator. For example, one of the frequency sources may be used corresponding to a '0' bit and another of the frequency sources may be used corresponding to a '1' bit. The phase and/or amplitude of the frequency sources may also be varied to produce a subcarrier frequency that is phase and/or amplitude modulated.

The symbol generator 230 may control the modulator 220 to backscatter an incident signal having a carrier frequency (e.g. the signal 130 of FIG. 1) using the subcarrier frequency to provide a backscattered signal at the antenna. By mixing the carrier frequency with the subcarrier frequency or harmonics thereof, the backscattered signal may include a bandpass signal in a predetermined frequency range. The predetermined frequency range may be specified by a combination of the carrier and subcarrier frequencies.

In some examples, the backscatter device 200 may use sub-harmonic mixing to permit a carrier at a fraction of a desired band-pass signal frequency to produce energy in the desired communication frequency band. In such embodiments, if the desired communication carrier frequency is at a frequency $F_{carrier}$, the signal source (e.g. the signal source 100 of FIG. 1) may be at a sub-harmonic frequency $F_{carrier}/n$ where n is a harmonic number. For example, an 800 MHz carrier may be used in a sub-harmonic mode to generate backscatter energy in the 2.4 GHz band (in this example, n=3) due to harmonic mixing in the backscatter device.

In some examples, the predetermined frequency range may be a range specified by a wireless communication protocol (e.g. a wireless communication standard). For example, the wireless communication protocol may be Bluetooth Low Energy and the frequency range may be a range of an advertising channel specified by a Bluetooth Low Energy specification.

Accordingly, the symbol generator 230 may control the modulator to modulate the magnitude and/or phase of an incident signal to generate a backscattered signal. The backscattered signal may encode data, which may be provided to the symbol generator 230. The data may be, e.g. data collected by a sensor or other device in communication with the backscatter device 200. The data may be stored by the backscatter device 200. Examples of the data include, but are not limited to, a temperature of a portion of a building, an identity of an inventory item, a temperature of a food container, neural recording data, a biological or physiological signal including measurement of a parameter relevant to human or animal health such as heart rate, blood pressure, body chemistry such as oxygen level, glucose level, the level of another analyte, or neural data such neural recording data or muscle activity such as electromyelogram or EMG data). For example, a neural recording may be relayed from a neural recording sensor (e.g. on an animal subject, such as an insect, e.g. a dragonfly). The backscattered signal may be formatted in accordance with a protocol expected by a wireless communication device (e.g. a wireless communication standard). Accordingly, the backscattered signal may include a packet. The symbol generator 230 may control the modulator 220 to provide a packet formatted in accordance with a particular wireless communication protocol. The packet may include a preamble, an access address, a payload data unit, and a cyclic redundancy check.

The symbol generator may be implemented using hardware, software, or combinations thereof. In some examples, the symbol generator 230 may be implemented using a microprocessor.

In some embodiments the backscatter device 200 may include a processor (not shown in FIG. 2, but which processor may be in communication with the symbol generator 230). The processor may be, for example, implemented using fixed-function digital logic (such as a finite state machine or FSM) or a microprocessor or microcontroller which implements operations including memory and optional sensor inputs. In such examples the processor may encode a data stream including a unique identifier for the backscatter device 200. Accordingly, the transmitted backscattered signal may include a unique identifier for the backscatter device 200. In some examples, the optional sensor inputs may influence one or more bits of the data stream in such a way as to encode the value of the optional sensor inputs into the data stream by changing the unique identifier that is sent. In such cases the aforementioned data stream may then be fed into the symbol generator as described herein and shown in FIG. 2.

In some examples, the processor formats the unique identifier, the optional sensor input(s), and/or other data that is desired to be sent in the transmitted backscattered signal into a specified packet format, such as but not limited to a Bluetooth Low Energy advertising packet, an IEEE 802.11 beacon frame, an IEEE 802.15.4 beacon frame, or another specified packet format. In such examples the packet format may then form a data stream which may be provided to the symbol generator as described herein. In some examples, such as in the case of the Bluetooth Low Energy advertising packet, information about the channel on which the packet is being sent may be encoded in to the data stream itself. In such examples, the channel number may be derived from the parameters of the carrier frequency and the configuration of the symbol generator as described herein.

In some examples, an incident signal from a signal source (e.g. the signal source 100 of FIG. 1) may be bursty—e.g. the signal source may provide a packetized signal which is exploited by the backscatter device 200 in generating a backscattered signal. Accordingly, in some examples, the signal source itself may be controlled to provide communications that are as lengthy and/or continuous as possible. For example, when a Bluetooth communication signal is provided by the signal source 100, the signal source may provide packets sent with a maximum PDU length of 312 bits. In some examples, the signal source may provide packets (e.g. Bluetooth packets) sequentially without gaps between the packets—for example without gaps between the final CRC bit of one packet and the first preamble bit of a next packet. These techniques may increase an amount of time available during which a backscatter device may produce a backscatter signal in some examples. In some examples, the backscatter device (e.g. the backscatter device 110 of FIG. 1 and/or the backscatter device 200 of FIG. 2) may backscatter packets having a duration selected to be transmitted within a time the signal source takes to provide a packet. So, for example, the signal source may provide a Bluetooth packet having a PDU length of 312 and the backscatter device 200 may have a smaller PDU length such that the packet can be backscattered during the time the packet from the signal source is incident on the backscatter device. The backscatter device may include a receiver that may receive the signal from the signal source and provide an indication of when to start and/or stop backscattering based on presence, absence, or content of the signal 130 from the signal source 100.

In some examples, the signal source may provide packets which are specifically chosen to yield advantageous properties which may be exploited by the backscatter device 200 in generating a backscattered signal. In some embodiments such advantageous properties may include the length and/or duration of a packetized signal emitted by signal source 100. In other embodiments, packets transmitted by signal source 100 may be selected so as to increase and/or maximize energy in a preferred frequency range. For example, in the case of signal source 100 using a binary frequency shift keying modulation, the packets transmitted by the signal source may be constructed so as to favor the production of one of the two frequencies transmitted and reduce and/or minimize the number of transitions between the two frequencies within a given packet. In the case of a signal source 100 using a phase shift keying modulation, the packets transmitted by the signal source may be constructed to reduce and/or minimize the number of phase transitions within a given packet. In the case of a signal source 100 using an orthogonal frequency division multiplexing (OFDM) signal, the packets transmitted by the signal source may be constructed to improve and/or maximize energy in a chosen OFDM subcarrier and minimize and/or reduce energy in other OFDM subcarrier frequencies. Accordingly, the signal source 100 may provide a signal 130 whose features may be selected based on a number of frequency transitions in the signal, a number of phase transitions in the signal, a number of amplitude transitions in the signal, and/or a number of energy-bearing subcarriers in the signal, or combinations thereof. For example, the signal may include a packet selected to minimize one or more of (a) a number of frequency transitions in the incident signal, (b) a number of phase transitions in the incident signal (c) changes in amplitude of the incident signal, or (d) a number of energy bearing subcarriers of the incident signal.

The backscatter device 200 may provide a transmitted backscattered signal compatible with an FSK or GFSK standard employed by a receiving wireless communication device. The symbol generator 230 may include or be in communication with a frequency source that may be operated at one of two frequency states, $F_{mod1}$ or $F_{mod2}$. The selection of the frequency state may be made under the control of data that is input to the symbol generator (e.g. from a sensor or microprocessor). The frequency source may include, for example, a resistance-capacitance (RC) oscillator, an inductance-capacitance (LC) oscillator, a quartz crystal oscillator, a frequency synthesizer, the output of a digital-to-analog converter, the output of a direct digital synthesizer, the output of a clock generator, an arbitrary waveform generator, or any other analog or digital frequency source or combinations thereof. In some examples, the aforementioned frequency source produces a square-wave output, and in some examples the aforementioned frequency source produces a sinusoidal output. In some examples the frequency source produces any waveform having energy at least including the frequency components $F_{mod1}$ and $F_{mod2}$. In some examples regulatory limits on occupied bandwidth or other properties of the signal may influence the choice of frequency source waveforms.

In some examples, the sum of the frequency of an incident carrier $F_{carrier}$ (e.g. the carrier received from the signal source 100 of FIG. 1), plus the average of $F_{mod1}$ and $F_{mod2}$ is provided to be within an acceptable range (e.g. a range at which it may be correctly received by a receiving device communicating in accordance with that specification) of a channel center frequency signal specification. In such examples, $x=F_{carrier}+\text{mean}(F_{mod1}, F_{mod2})$, where x is a frequency within an acceptable range of a channel center frequency signal specification. In such examples, the frequency source in the backscatter device may have any waveform shape. In such examples, the difference between the two frequencies, $d1=\text{abs}(F_{mod1}-F_{mod2})$, where abs( ) denotes the absolute value operator, is provided to be within an acceptable frequency deviation range of a frequency shift keying (FSK) or Gaussian frequency shift keying signal specification.

In some examples, the difference $y=F_{carrier}-\text{mean}(F_{mod1}, F_{mod2})$ is provided to be within an acceptable range (e.g. a range at which it may be correctly received by a receiving device communicating in accordance with that specification) of a channel center frequency signal specification. In such examples, the frequency source may have any waveform shape. In such examples, the difference between the two frequencies, $d2=\text{abs}(F_{mod1}-F_{mod2})$, where abs( ) denotes the absolute value operator, is provided within an acceptable frequency deviation range of a frequency shift keying (FSK) or Gaussian frequency shift keying signal specification.

In some examples, harmonics of the backscatter signal may be used to form the transmitted backscattered signal. In such examples, the parameters $F_{carrier}$, $F_{mod1}$, and $F_{mod2}$ are provided such that: $z=F_{carrier}\pm(n\times\text{mean}(F_{mod1}, F_{mod2}))$, where n is a harmonic number and z is within an acceptable range (e.g. a range at which it may be correctly received by a receiving device communicating in accordance with that specification) of a channel center frequency signal specification. A further constraint on $F_{mod1}$ and $F_{mod2}$ may be that the frequency difference $a=n\times\text{abs}(F_{mod1}-F_{mod2})$ is within an acceptable range (e.g. a range at which it may be correctly received by a receiving device communicating in accordance with that specification) of the frequency deviation specification. Thus the spacing between $F_{mod1}$ and $F_{mod2}$ may be reduced by a factor corresponding to the harmonic number employed, compared to the fundamental-mode where n=1.

In such examples, the frequency source may preferentially have a square wave shape with n being an odd number, but any waveform shape having energy at the harmonics of $F_{mod1}$ and $F_{mod2}$ are possible. In these embodiments the frequencies the difference between the two frequencies, $d2=n\times\text{abs}(F_{mod1}-F_{mod2})$, where abs( ) denotes the absolute value operator, is provided to be within an acceptable frequency deviation range (e.g. a range at which it may be correctly received by a receiving device communicating in accordance with that specification) of a frequency shift keying (FSK) or Gaussian frequency shift keying signal specification.

In some embodiments the frequency source switches nearly instantaneously between $F_{mod1}$ and $F_{mod2}$ at a rate within an acceptable symbol rate range of a signal specification (e.g. a range at which it may be correctly received by a receiving device communicating in accordance with that specification). In other examples the frequency source transitions smoothly between $F_{mod1}$ and $F_{mod2}$ over a period of time, such that the transition is completed within an acceptable symbol rate range of a signal specification (e.g. a range at which it may be correctly received by a receiving device communicating in accordance with that specification). In some examples, the smooth transition between $F_{mod1}$ and $F_{mod2}$ occurs according to a function of time such that the occupied bandwidth of the backscattered signal complies with a regulatory or specification requirement. In some examples, the transition is designed to produce a Gaussian frequency shift keying spectrum. It should be understood that, while some examples herein refer to a binary FSK or GFSK modulation scheme, including two modulator frequencies ($F_{mod1}$ and $F_{mod2}$), other examples may include more than two modulator frequencies, such as in m-ary FSK, where m refers to a number of frequency states. In such cases multiple modulator frequencies ($F_{mod1}$ . . . $F_{mod\_m}$) may be employed. The analogous constraints on the choice of fundamental-mode and harmonic-mode modulator frequencies would be applied as described herein.

In some examples, an incident signal provided by a source device may be a signal in one channel in accordance of a wireless communication standard (e.g. a Bluetooth signal) and may be backscattered by the backscatter device 200 into another channel of the wireless communication device. For example, a source device may provide a signal on Bluetooth channel 38 and the backscatter device 200 may backscatter the signal on Bluetooth channel 38 into a backscatter signal on Bluetooth channel 37 and/or 39. Other channels may be used in other examples. Furthermore a source device may produce a signal using a first wireless communication standard which the backscatter device retransmits in a manner compatible with a second wireless communication standard.

The backscatter device 200 may provide a transmitted backscattered signal compatible with phase shift keying (PSK) standard employed by a receiving wireless communication device. The PSK standard may have at least one or more specified phase differences, one or more specified channel center frequencies and one or more specified symbol rates.

In examples utilizing PSK, the symbol generator 230 may include a frequency source that may be operated at a frequency $F_{mod}$ with one of at least two phase states, $P_{mod1}$, $P_{mod2}$ through $P_{mod\_n}$. The selection of the phase state is made under the control of a data stream input to the symbol generator. For example, one phase state may be selected corresponding to a '0' bit and another phase state selected corresponding to a '1' bit. In some examples, such as in the binary phase shift keying (BPSK) case, $P_{mod1}$ and $P_{mod2}$ differ by 180 degrees (pi radians). In other embodiments, such as n-PSK where n is the number of different phase states, multiple different phases may be employed.

The frequency source may include a resistance-capacitance (RC) oscillator, an inductance-capacitance (LC) quartz crystal oscillator, a frequency synthesizer, the output of a digital-to-analog converter, the output of a direct digital synthesizer, the output of a clock generator, an arbitrary waveform generator, or any other analog or digital frequency source. In some examples, the aforementioned frequency source produces a square-wave output, while in other embodiments the aforementioned frequency source produces a sinusoidal output.

In some examples the frequency source produces any waveform having energy at least including the frequency component $F_{mod}$ with a phase that can be varied from $P_{mod1}$ to $P_{mod2}$ through $P_{modn}$.

In some examples, the sum of the frequency of an incident carrier $F_{carrier}$, plus the $F_{mod}$, is provided within an acceptable range (e.g. a range at which it may be correctly received by a receiving device communicating in accordance with that specification) of a channel center frequency signal specification, such that $x = F_{carrier} + F_{mod}$. In such embodiments, the frequency source may have any waveform shape. In such examples, the difference between the phase states $P_{mod1}$, $P_{mod2}$ through $P_{modn}$, is selected to be within an acceptable phase shift range (e.g. a range at which it may be correctly received by a receiving device communicating in accordance with that specification) of a phase shift keying (PSK) signal specification.

In some embodiments, the difference $y = F_{carrier} - F_{mod}$ is provided to be within an acceptable range (e.g. a range at which it may be correctly received by a receiving device communicating in accordance with that specification) of a channel center frequency signal specification. In such examples, the frequency source may have any waveform shape. In such examples, the difference between the phase states $P_{mod1}$, $P_{mod2}$ through $P_{modn}$, is selected to be within an acceptable phase shift range (e.g. a range at which it may be correctly received by a receiving device communicating in accordance with that specification) of a phase shift keying (PSK) signal specification.

In some examples, the parameters $F_{carrier}$ and $F_{mod}$ are provided such that: $z = F_{carrier} \pm (n \times F_{mod})$, where n is a harmonic number, and z is within an acceptable range (e.g. a range at which it may be correctly received by a receiving device communicating in accordance with that specification) of a channel center frequency signal specification. In such embodiments, the frequency source may preferentially have a square wave shape with n being an odd number, but any waveform shape having energy at the harmonics of $F_{mod}$ are possible.

In some embodiments the frequency source switches nearly instantaneously between phase states at a rate within an acceptable symbol rate range (e.g. a range at which it may be correctly received by a receiving device communicating in accordance with that specification) of a signal specification. In some examples, the frequency source transitions smoothly between phase states over a period of time, such that the transition is completed within an acceptable symbol rate range (e.g. a range at which it may be correctly received by a receiving device communicating in accordance with that specification) of a signal specification. In some embodiments, the smooth transition between phase states occurs according to a function of time such that the occupied bandwidth of the backscattered signal complies with a regulatory or specification requirement.

The backscatter device 200 may provide a transmitted backscattered signal compatible with amplitude shift keying (ASK) standard employed by a receiving wireless communication device. The ASK standard may have a specified modulation depth, one or more specified channel center frequencies, and one or more specified symbol rates.

To implement amplitude shift keying of the reflected or scattered signal, two example implementations are described. In examples using 100% modulation depth amplitude shift keying (e.g. sometimes called on-off keying or OOK), one input to the modulator (e.g. modulator 220 of FIG. 2) may be provided. This input may be toggled (e.g. by the symbol generator 230) at a first frequency $F_{modsc}$ for one symbol period when the symbol to be sent is e.g. a "1". The input is held off (e.g. not toggled) for one symbol period when the symbol to be sent is e.g. a "0".

In some examples, at least two inputs to the backscatter modulator are provided to permit amplitude shift keying with other than 100% modulation depth. A first input is used to generate a subcarrier frequency by switching the modulator 220 at a first frequency $F_{modsc}$. A second input is used to vary the modulation depth of the subcarrier frequency at the symbol rate. One method for varying the modulation depth is to add a resistor in parallel with the aforementioned modulator 220, such as a resistor with a resistance R in parallel with the switching FET. In such an embodiment, the real part of the impedance presented to the antenna then varies between the real part of the parallel circuit with the transistor off (R //transistor impedance_off) and the real part of the parallel circuit with the transistor on (R //transistor impedance_on). The backscattered subcarrier will then have two different modulation depths when the second input is switched between a "1" and a "0" in accordance with the data to be sent.

In examples using ASK, the symbol generator 230 may include a subcarrier frequency source that may be operated at a frequency $F_{modsc}$. The frequency source may include a resistance-capacitance (RC) oscillator, an inductance-capacitance (LC) oscillator, a quartz crystal oscillator, a frequency synthesizer, the output of a digital-to-analog converter, the output of a direct digital synthesizer, the output of a clock generator, an arbitrary waveform generator, or any other analog or digital frequency source. In some examples, the aforementioned frequency source produces a square-wave output, while in other embodiments the aforementioned frequency source produces a sinusoidal output. In some examples the frequency source produces any waveform having energy at least including the frequency component $F_{modsc}$.

In some examples, the sum of the frequency of an incident carrier $F_{carrier}$, plus the $F_{modsc}$ is provided to be within an acceptable range (e.g. a range at which it may be correctly received by a receiving device communicating in accordance with that specification) of a channel center frequency signal specification, such that $x1 = F_{carrier} + F_{modsc}$. In such examples, the frequency source may have any waveform shape.

In some examples, the difference $y1 = F_{carrier} - F_{modsc}$ is selected to be within an acceptable range (e.g. a range at which it may be correctly received by a receiving device communicating in accordance with that specification) of a channel center frequency signal specification. In such examples, the frequency source may have any waveform shape.

In some examples, the parameters $F_{carrier}$ and $F_{modsc}$ are chosen such that: $z = F_{carrier} \pm (n \times F_{modsc})$, where n is a harmonic number, and z is within an acceptable range (e.g. a range at which it may be correctly received by a receiving device communicating in accordance with that specification) of a channel center frequency signal specification. In such embodiments, the frequency source may preferentially have a square wave shape with n being an odd number, but any waveform shape having energy at the harmonics of $F_{modsc}$ are possible.

In some examples the modulator switches nearly instantaneously between two modulation depth states at a rate within an acceptable symbol rate range (e.g. a range at which it may be correctly received by a receiving device communicating in accordance with that specification) of a signal specification. In other embodiments the frequency source transitions smoothly between modulation depth states over a period of time, such that the transition is completed within an acceptable symbol rate range (e.g. a range at which it may be correctly received by a receiving device communicating in accordance with that specification) of a signal specification. In some embodiments, the smooth transition between modulation depth states occurs according to a function of time such that the occupied bandwidth of the backscattered signal complies with a regulatory or specification requirement.

The backscatter device 200 may provide a transmitted backscattered signal compatible with orthogonal frequency division multiplexing (OFDM) standards employed by a receiving wireless communication device. Generally, techniques described herein for providing backscattered FSK, PSK, QAM, and ASK signals may be extended to produce OFDM signals.

In examples using OFDM, multiple band-pass signals may be generated by the modulator 220, one such bandpass signal per OFDM subcarrier. This may be implemented by providing multiple modulator frequencies such that their fundamental mode and/or harmonic mode frequency components align with the subcarrier spacing specified for the OFDM standard and/or technique. Each of the OFDM subcarriers may be modulated with e.g. a PSK signal per the description herein for PSK modulation examples. The multiple modulator frequencies may be applied to the same modulator (e.g. transistor). In some examples, a non-linear mixing operation may be implemented using a logic combination of the multiple modulator frequencies such as an exclusive-or (XOR) gate or an OR gate.

In some examples, a linear operation may be employed via an analog power combination of the multiple modulator frequencies provided to the modulator 220.

In some examples, the backscatter device 200 may harvest at least part of its operating power from the environment, for example using an optional RF energy harvesting circuit that may be included in and/or co-located with the backscatter device 200. In some embodiments this energy may be used directly by the backscatter device 200, while in other embodiments this energy may be stored in a reservoir such as but not limited to a capacitor, a supercapacitor, or a battery that is included in and/or co-located with the backscatter device 200. In such examples harvested energy may be accumulated in the reservoir for a period of time and then released to the operating circuitry of the backscatter device 200. This may be either a predetermined period of time, or a period of time corresponding to a time at which the reservoir reaches a particular amount of stored energy.

Figure 3:
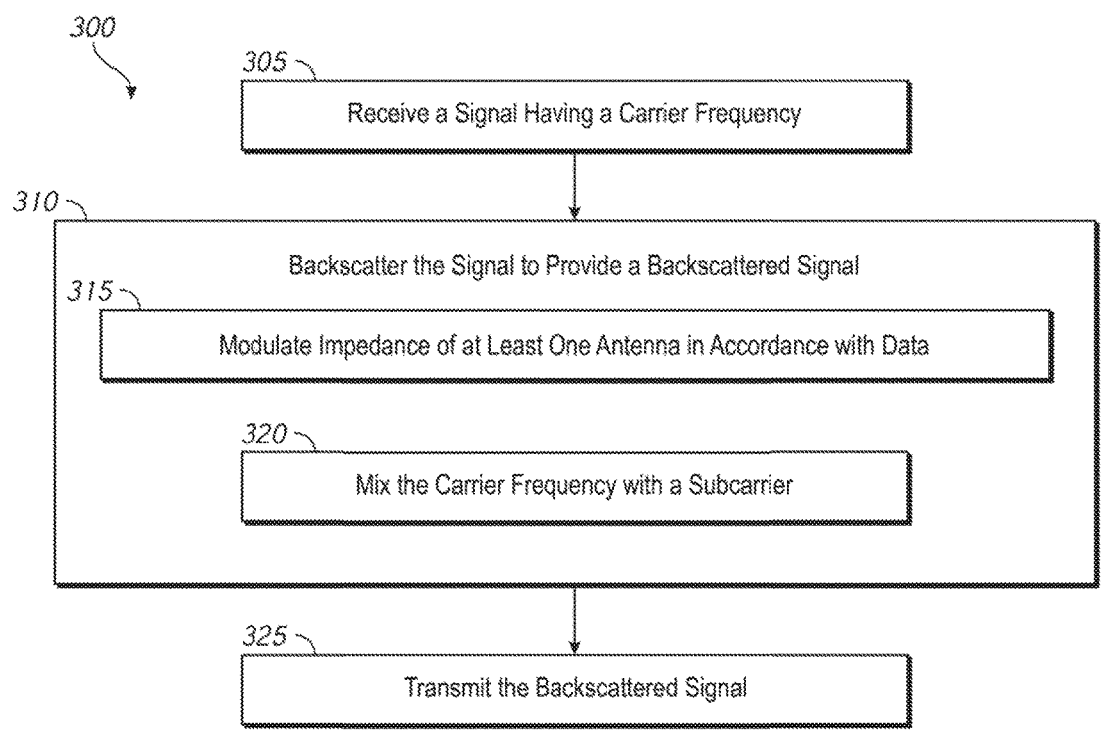
FIG. 3 is a flowchart illustrating a method in accordance with examples described herein.

FIG. 3 is a flowchart illustrating a method in accordance with examples described herein. The method includes receiving a signal having a carrier frequency in block 305, backscattering the signal to provide a backscattered signal in block 310. Block 310 may include modulating impedance of at least one antenna in accordance with data (block 315) and mixing the carrier frequency with a subcarrier (block 320). The method 300 also including transmitting the backscattered signal in block 325.

Block 305 may be implemented, for example, by the backscatter device 200 of FIG. 2 or the backscatter device 110 of FIG. 1 receiving a signal having a carrier frequency (e.g. the signal 130 of FIG. 1) at their antenna. Block 310 may be implemented, for example, by the backscatter device 200 of FIG. 2 or the backscatter device 110 of FIG. 1. For example, the symbol generator may receive data and control the modulator of FIG. 2 to modulate impedance of the antenna 215 of FIG. 2 in block 315. This process may involve mixing the subcarrier frequency with the carrier frequency.

The backscattered signal may then be transmitted in block 325 to produce, for example, the transmitted backscatter signal 135 of FIG. 1.

The signal having a carrier frequency may be backscattered in block 310 to provide a backscattered signal. This may include mixing the carrier frequency with a subcarrier in block 320. The mixing in block 320 may result in a bandpass signal having a predetermined frequency range. The predetermined frequency range may be a range of an advertising channel in accordance with a wireless communication standard, such as the Bluetooth Low Energy standard.

Backscattering the signal in block 310 may include modulating impedance of at least one antenna in accordance with data to be provided in the backscattered signal. Modulating may include reflecting the signal in a pattern indicative of the data to be provided in the backscattered signal. The data to be provided in the backscattered signal may include a packet having a preamble, an access address, a payload data unit, and a cyclic redundancy check. The data may include, for example, an indication of a temperature associated with a device providing the backscattered signal, or an identification of an asset associated with a device providing the backscattered signal.

Packets that may be provided in accordance with examples described herein include, but are not limited to, Bluetooth Low Energy advertising packets, IEEE 802.11 beacon frames, and IEEE 802.15.4 beacon frames.

Furthermore, it should be appreciated that the backscatter device 200 may employ one or more of the methods disclosed herein to generate a coded modulation such as a polyphase coded sequence of chips or symbols formed from one or more of the ASK, PSK, or QAM signals as described herein. One example of the polyphase coded sequences that may be generated by the backscatter device 200 may be a complementary code keying (CCK) sequence.

Figure 5:
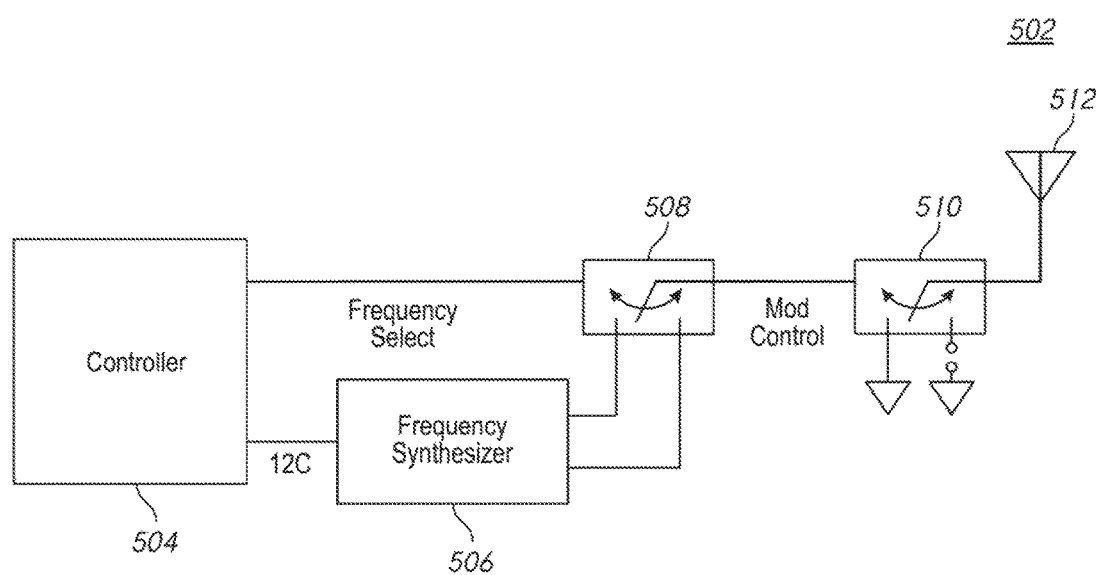
FIG. 5 is a schematic illustration of a backscatter device arranged in accordance with examples described herein.

FIG. 5 is a schematic illustration of a backscatter device arranged in accordance with examples described herein. The backscatter device 502 may be used to implement and/or be implemented by the backscatter device 110 of FIG. 1 and/or the backscatter device 200 of FIG. 2 in some examples. The backscatter device 502 includes a controller 504, frequency synthesizer 506, analog switch 508, RF switch 510, and antenna 512.

The RF switch 510 may be coupled to antenna 512 and may modulate an impedance of the antenna in order to backscatter an incident signal, the signal 130 provided by a signal source in FIG. 1. The RF switch 510 may provide subcarrier modulation using a subcarrier frequency. In some examples, one of multiple frequencies may be selected—e.g. one corresponding to a '0' bit and another corresponding to a '1' bit. Accordingly, in some examples an analog switch 508 may be provided to select between multiple frequencies provided by one or more frequency synthesizers, such as frequency synthesizer 506. While a single frequency synthesizer 506 is shown in FIG. 5, multiple frequency synthesizers may be provided in other examples. A controller 504 may be coupled to the analog switch 508 and, in some examples, the frequency synthesizer 506. The controller 504 may provide data (e.g. data for transmission in a backscattered signal) to control the analog switch 508. The controller 504 may provide control signals (e.g. an indication of one or more frequencies for use in backscatter), to the frequency synthesizer 506. For example, the controller 504 may be used to program the frequency synthesizer 506 to produce one or more particular frequencies for sub-carrier modulation.

The antenna 512 may be implemented using any of a variety of antennas including, but not limited to, a chip antenna, a trace antenna (e.g. antennas integrated into a chip including the RF switch 510 and/or analog switch 508), a dipole antenna, or combinations thereof. Other antennas may also be used.

It may be desirable to have a phase continuous transition between multiple subcarrier modulation frequencies (e.g. the two frequencies provided by the frequency synthesizer 506). For example, at the transition between a "0" and a "1" data bit the modulation signal should maintain its phase. In some examples, the modulation signal may be directly digitally synthesized using an arbitrary waveform generator. In some examples, however, coordination between subcarrier signals may be used. For example, the frequency synthesizer 506 may provide a number (e.g. 2, 3, 4, 5, 6, 7, 8, 9, 10) of output frequencies from a common frequency reference. By using harmonics of the data rate at which the backscatter signal will be provided (e.g. the BLE data), a constant phase may be maintained between the multiple (e.g. two) subcarrier frequencies at the time of bit transitions. For example, by choosing subcarrier frequencies spaced apart by a BLE data rate a continuous phase at the transition times may be provided.

EXAMPLE

These detailed examples of systems operating in accordance with a Bluetooth Low Energy specification are provided to facilitate understanding, although it is not intended to be limiting, nor to indicate that these were the only detailed example investigated, contemplated, or implemented.

In one example a system provides interoperability between a backscatter device and a wireless communication device having a Bluetooth Low Energy chipset as is commonly found in mobile devices such as tablet computers, such as the APPLE iPAD or SAMSUNG GALAXY tablets or smart phones such as the APPLE IPHONE or SAMSUNG GALAXY series.

The Bluetooth Low Energy (BTLE) specification details a wireless communication scheme using Gaussian frequency shift keying with a channel specification of 40 channels with center frequencies ranging from 2402 MHz to 2480 MHz. The data rate is 1.0 Mbps while the channel spacing is 2.0 MHz. The minimum frequency deviation is 185 kHz.

Three of the 40 channels, channels 37, 38, 39, with center frequencies of 2402 MHz, 2426 MHz, and 2480 MHz respectively, are referred to as advertising channels. A conventional Bluetooth Low Energy device listens on each of the advertising channels in turn to identify nearby BTLE devices.

In one example, the modulator (e.g. modulator 220 of FIG. 2) is implemented using a type BF1108R field effect transistor manufactured by NXP, Inc. The symbol generator (e.g. symbol generator 230 of FIG. 2) is implemented using an Agilent 335008 arbitrary waveform generator. The source and drain terminals of the field effect transistor are connected to a first dipole antenna resonant near 2450 MHz. The signal source (e.g. signal source 100 of FIG. 1) is implemented using an Agilent N5181A signal generator set to a desired carrier frequency $F_{carrier}$, with an output power of +15 dBm, connected to a second dipole antenna resonant near 2450 MHz. The wireless communication device receiving the communication (e.g. the wireless communication device 120 of FIG. 1) is implemented using an APPLE IPAD running APPLE IOS with the Pally BLE scanner application.

In one example, the signal source (e.g. the signal source 100 of FIG. 1) is implemented as supplying a dedicated carrier source with a frequency of $F_{carrier}$=2453 MHz. To produce a bandpass signal in the Channel 38 and 39 passbands, modulating frequencies $F_{mod1}$=26.7 MHz and $F_{mod2}$=27.3 MHz. The sum of the carrier frequency plus the mean of the two modulation frequencies is 2453 MHz+mean (26.7 MHz, 27.3 MHz)=2480 MHz (Channel 39), leveraging the upper sideband modulation, while the difference between the carrier frequency and the mean of the two modulation frequencies is 2453 MHz−mean(26.7 MHz, 27.3 MHz)=2426 MHz (Channel 38), leveraging the lower sideband modulation. Thus a single carrier frequency may serve multiple channels using the previously mentioned fundamental mode approach. Note that in this implementation the frequency deviation between the two modulation frequencies is 600 kHz which complies with the required minimum frequency deviation specification of 185 kHz.

To produce a bandpass signal in the Channel 37 passband of 2402 MHz, a second harmonic (n=2) approach may be used. In this case, modulating frequencies $F_{mod1}$=25.35 MHz and $F_{mod2}$=25.65 MHz. Thus the second harmonic band-pass signal falls at 2453 MHz−2*mean(25.35 MHz, 25.65 MHz)=2402 MHz. Note that in this implementation the difference between the two modulation frequencies is only 300 kHz to yield a second-harmonic difference of 600 kHz which complies with the minimum frequency deviation specification of 185 kHz.

In this manner, all three advertising channels may be addressed using only a single carrier frequency of 2453 MHz. The modulating frequencies are in the range of 25.35 MHz to 27.3 MHz which is far lower than the carrier frequency. Thus the backscatter device may consume far less power than would be required to generate the carrier frequency. In this example the symbol generator comprises an Agilent 33500B arbitrary waveform generator using a waveform synthesized as a sampled vector using the MATLAB signal processing toolbox. The symbol rate is 1.0 Msps.

Figure 4:
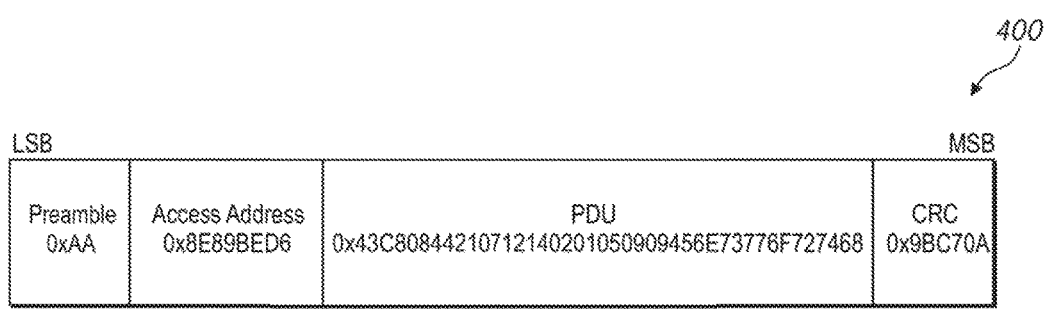
FIG. 4 is a schematic illustration of an example packet compatible with the BTLE specification.

In this example, the symbol generator (e.g. symbol generator 230 of FIG. 2) is produces a packet format compatible with the BTLE specification. FIG. 4 is a schematic illustration of an example packet compatible with the BTLE specification. From the least significant bit to the most significant bit, an example packet includes the preamble OxAA, the access address Ox8E89BED6, the payload data unit Ox43C808442107121420201050909456E73776F727468, and the cyclic redundancy check Ox9BC70A. The MATLAB signal processing toolbox encodes the packet using the data whitening function specified in the BTLE specification. A different data whitening function input is used for communication over each channel. For each bit in the encoded packet, the modulating frequency is set to $F_{mod1}$ if the corresponding bit is "0" and $F_{mod2}$ if the corresponding bit is "1". The packet shown in FIG. 4 may accordingly be transmitted as, for example, the transmitted backscatter signal 135 of FIG. 1.

In another example, a backscatter tag was developed that produces three-channel band-pass frequency shift keying (FSK) packets at 1 Mbps that are indistinguishable from conventional BLE advertising packets. Communication in all three of the BLE advertising channels was performed using a single incident continuous wave (CW) carrier and a combination of fundamental-mode and harmonic-mode backscatter subcarrier modulation. Further, a microcontroller-based backscatter tag capable of producing BLE advertising packets was demonstrated. Ranges of up to 18 meters were demonstrated between the CW carrier source and BLE receiver. In these examples, the BLE receiver was implemented using an unmodified Apple iPad mini using its existing iOS Bluetooth stack with no modifications whatsoever to hardware, firmware, or software.

Additionally, BLE advertising packets were generated with a non-CW carrier. Backscattered BLE packets were demonstrated using a BLE signal as a carrier source. Reception of the backscattered BLE messages was demonstrated with two unmodified BLE devices, an Apple iPad mini and a generic PC equipped with a Nordic Semiconductor nRF51882 BLE chipset. Each device successfully demodulated and accepted the advertising messages and passed them up their Bluetooth stacks without any modifications. Successful reception was shown at a range of 18 meters using a +23 dBm EIRP fixed frequency source and an unmodified Apple iPad mini.

A single FET was used as an RF switch (e.g. the RF switch 510 of FIG. 5) and an Agilent 33500B arbitrary waveform generator as the baseband modulation source. The backscatter device operated by modulating the load impedance presented to the antenna based on the baseband modulation signal. The test board itself included a single NXP BF1108R FET with the gate voltage controlled by an arbitrary waveform generator, the drain connected to ground, and the source connected to an SMA port with a 2.4 GHz dipole antenna. Messages were sent sequentially to channel 37, channel 38, and channel 39 with payload data units (PDUs) containing device names Alice, Bob, and Charlie. The control signal from the waveform generator was created in Matlab with a 220 MSa/s sampling rate to ensure that the ≈27 MHz subcarrier frequencies were faithfully reproduced. The sample vector was transferred to the arbitrary waveform generator via a USB stick. Three individual control vectors were concatenated, one for each of the three advertising channels. A sequence controlling the time varying subcarrier selection for a single channel was devised in accordance with the data, e.g. for a message to be sent on channel 39 with data "Charlie". A "1" bit was transferred with a positive subcarrier deviation and a "0" bit was transferred with a negative subcarrier deviation.

In an over the air (OTA) test with the BF1108R test board an unmodified Apple iPad running the BLE Scanner app was used to successfully receive the three messages, Alice, Bob, and Charlie from a single CW carrier. The separation distance between the CW carrier and Apple iPad was 9.4 meters, and tests were performed with the BF1108R test board at several locations between the carrier and iPad.

In an example of a backscatter device that does not rely on test equipment for a modulation source, an implementation that produces two subcarrier frequencies derived from a common frequency reference source was demonstrated. Selecting which of the two frequencies are used to drive a modulating FET (e.g. the RF switch 510 of FIG. 5) controlled whether a BLE "0" or "1" was being backscattered. An Atmel ATmega328 microcontroller on board an Arduino Nano was used to control which of the two subcarrier frequencies are driving the modulating FET (e.g. used to implement the controller 504 of FIG. 5). The use of an Arduino Nano facilitated programming the Atmel ATmega328 microcontroller. The subcarrier frequencies used in the BLE backscatter tag were produced by a Texas Instruments CDCE913 frequency generator chip used to implement the frequency synthesizer 506 of FIG. 5. The CDCE913 is a programmable component capable of producing output frequencies up to 230 MHz.

The Arduino Nano's 12C bus was used to program the frequency synthesizer to produce the desired subcarrier frequencies. Programming the frequency synthesizer required a one time write to the synthesizer's memory registers. The Arduino Nano was also used to drive a Texas Instruments SN74LVC1G3157 analog switch (e.g. used to implement the analog switch 508 of FIG. 5) controlling which of the sub-carrier frequencies drive the modulating FET (e.g. the RF switch 510 of FIG. 5). An N channel dual gate MOSFET, NXP BF1212, connects the tag antenna to either an open or short circuit depending on the modulation control signal. In other examples a different type of RF switching device may be connected to the tag antenna, such as a CMOS RF switch, for example the ADG918 CMOS RF switch manufactured by Analog Devices Inc.

The backscatter device had an SMA connector so a variety of connectorized antennas could be tested. Generally, if a smaller form factor is desired the antenna could be integrated into the PCB with a chip antenna, a patch antenna, or a trace antenna. If an application scenario calls for placement on or near a high dielectric surface the antenna could be specifically designed for that case as well. For the testing described in this specific example a dipole antenna was used.

To construct a BLE compatible signal it may be desirable to have a phase continuous transition between the two subcarrier modulation frequencies. At the transition between a "0" and a "1" data bit the modulation signal should maintain its phase. This could be accomplished with direct digital synthesis of the modulation signal as was done with the test equipment implementation using an arbitrary waveform generator. To create phase continuous transitions in the stand alone implementation, coordination between the subcarrier signals was used. Two independent free running oscillators were not used because they have no common phase relationship. The CDCE913 chip is capable of producing three separate output frequencies all derived from a common frequency reference input. By using harmonics of the BLE data rate we maintain a constant phase between the two subcarrier frequencies at the time of bit transitions. In an example bit transition, the BLE data rate is 1 Mbps meaning that ever 1 uSec there is a possibility for a bit transition and a switching from one subcarrier frequency driving the modulating FET to the other subcarrier. By choosing subcarrier frequencies spaced apart by the BLE data rate we can achieve a continuous phase at the transition times. Only the fundamental mode was used with messages being sent to BLE advertising channels 37 and 38. The message sent on channel 37 contained device name Alice and the message sent on channel 38 contained device name Bob. A single continuous wave frequency of 2414.5 MHz was used as the incident signal from a signal source. The lower side band (LSB) subcarrier frequencies were $f_{sc,0}$=12.5+0.5=13 MHz and $f_{sc,1}$=12.5−5=12 MHz. The upper side band (USB) frequencies were $f_{sc,0}$=11.5−0.5=11 MHz and $f_{sc,1}$=11.5+0.5=12 MHz. This resulted in backscattered signal present in Channel 37 (e.g. centered at 2402 MHz, with one sideband at 2401.5 and another at 2402.5 MHz) and Channel 38 (e.g. centered at 2426 MHz with one sideband at 2426.5 MHz and another at 2425.5 MHz). For testing two separate tags were used, one backscattering Alice messages and another backscattering Bob messages. Both tags used a packet length of 232 bits meaning their backscattering duration was 232 μS. The tags were constantly backscattering during testing with a 500 mS delay between packets.

In some examples, a data-carrying signal itself (e.g. a Bluetooth signal) may be used as the incident signal from a signal source to be backscattered by backscatter devices described herein. The Bluetooth 4.0 Low Energy spec has channels with a bandwidth of 2 MHz and a requirement for the subcarrier spacing of only ±185 kHz, which leaves a significant range of frequencies that are assigned to either a "1" or "0" data bit. This opens the possibility for using a conventional BLE signal as the carrier while still having the backscattered signal (e.g. message) fall within the BLE spec. Unlike typical backscatter systems that use a single frequency containing no data, this is an example of modifying a communication signal containing data and inserting a new message with a backscatter device.

With this scheme a smart phone or pair of smart phones may act as both the carrier source and the receiver. For a single device to operate as both the carrier and receiver the BLE chipset may operate in full duplex mode, simultaneously transmitting in one channel and receiving in another. In some examples, a single device may operate as the carrier for a backscatter device and any other BLE enabled devices in the area to receive both the BLE carrier message and the BLE backscattered signal.

The backscattered packet may be designed in the same way as described herein. Note that when a data-carrying (e.g. a communication signal) is used as the carrier instead of a continuous wave signal, the brief transmission time of the incident signal may be accounted for—e.g. the backscatter device should backscatter during a time that the signal source is providing an incident signal. When the incident signal is a packetized signal, it may be bursty. To create a carrier BLE message that is longer than the backscatter window we can take advantage of the BLE advertising packet's variable length PDU. A single conventional packet could be sent with the maximum PDU length, 312 bits, and the backscatter message may have a reduced PDU length so the backscatter window falls inside the time to transmit a conventional packet. Alternatively, and as was done in this example, multiple conventional BLE packets can be broadcast sequentially without gaps between the final CRC bit of one message and the first preamble bit of the next message.

In one example multiple conventional BLE packets were transmitted with no gaps between the end of one transmission and the beginning of the next. The BLE packets were transmitted each containing the message Bob, At some time while the sequence of Bob messages was being broadcast an Alice packet was backscattered using the Bob transmissions as a carrier. There was no data coordination between the conventional source packet and the backscattered packet. The conventional transmission could have contained any message, the use of Bob messages was only to show that both the conventional message and backscattered message can be received by an unmodified receiver in an Apple iPad mini.

Another factor is how an FSK receiver interprets the backscattered signal. If a conventional BLE message is modulated such that the subcarrier frequency deviations are kept close to the minimum required in the BLE spec, ±185 kHz, a message from one channel can be backscattered to a new channel containing entirely new data. The original frequency deviation is still present in the backscattered signal but it may become a deviation contained entirely in the "0" or "1" frequency range as determined by the backscatter modulation. In some embodiments, the original frequency deviation may be minimized by causing the signal source 100 to transmit specially chosen packets which minimize the number of frequency transitions in the packet and thus minimize the effective original frequency deviation.

For example, a conventional BLE message was created for channel 38 and that message was then backscattered to channel 37. This method may generally work with any channel combination. The message on channel 38 may contain device name "Bob and the backscattered message on channel 37 may contain device name "Alice." (e.g. the data on the source and backscattered signals may be unrelated). The conventional source signal was constantly broadcasting in channel 38 and it was switching between 2 FSK frequencies, 2426.75 MHz and 2426.25 MHz at a 1 Mbps data rate. This is similar in concept to using a continuous wave signal that drifts quickly in time or has high phase noise. The exact carrier frequency may not be known but the range may be specified and that range may be narrow enough to still be useful.

Figure 6A:
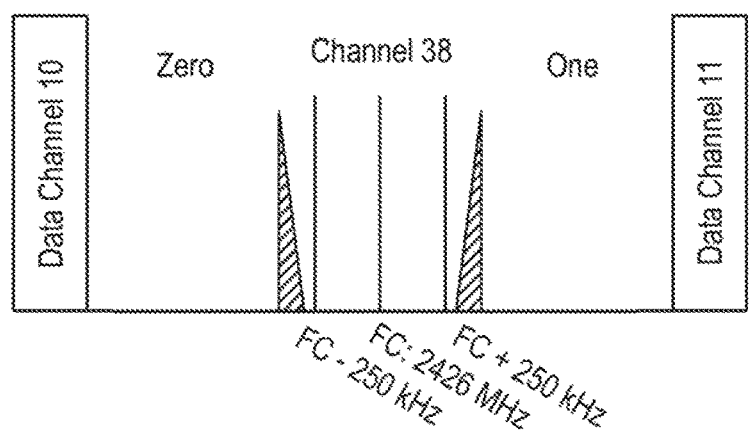
FIGS. 6A-6C are schematic illustrations of spectra of a Bluetooth source signal in Channel 38 (FIG. 6A) and the backscattered '0' signal in Channel 37 (FIG. 6B) and the backscattered '1' signal in Channel 37 (FIG. 6C).
Figure 6B:
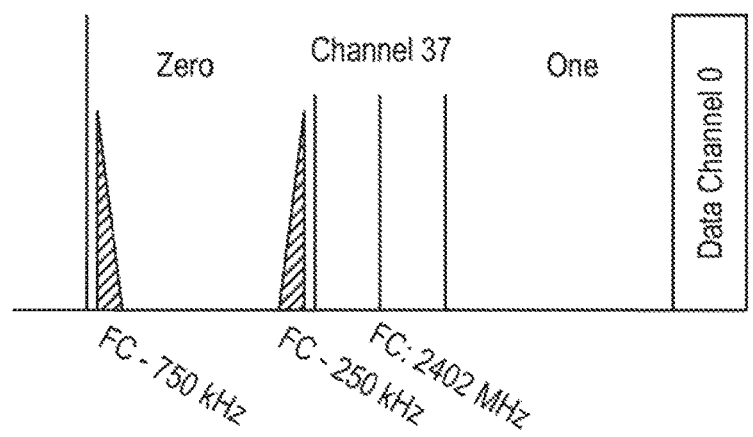
Figure 6C:
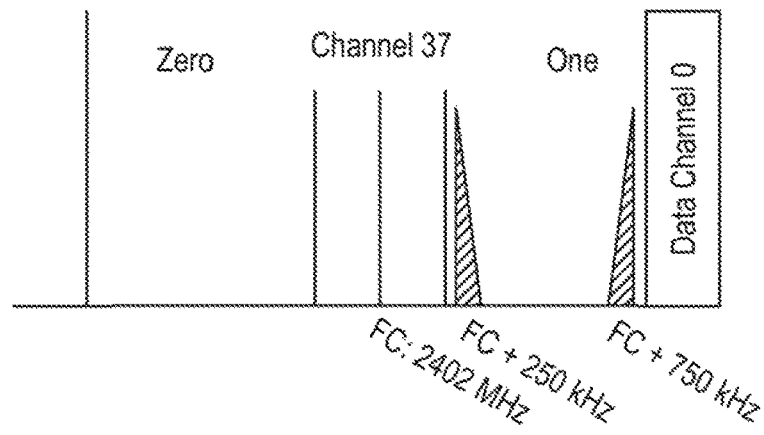

FIGS. 6A-6C are schematic illustrations of spectra of the source signal in Channel 38 (FIG. 6A) and the backscattered '0' signal in Channel 37 (FIG. 6B) and the backscattered '1' signal in Channel 37 (FIG. 6C). The BLE transmission designed for channel 38 was backscatter-modulated with subcarrier frequencies of 24 MHz±500 kHz. In FIG. 6A, the channel 38 source signal is shown centered at 2426 MHz with sidebands at + and −250 kHz. The 500 kHz frequency deviation is able to shift either of the channel 38 frequencies to the "0" or "1" frequency range for channel 37. Since the carrier and backscattered message are both BLE packets the data rate, 1 Mbps, is the same for both. That means there will be at most one carrier frequency deviation per bit in the backscattered signal. For example, over 1 uSec, the duration of 1 bit of the backscatter message, if the carrier message transitions from a "0" to a "1" and the backscatter data bit is a "1" the receiver will see first 2402.25 MHz and then 2402.75 MHz. Both 2402.25 MHz and 2402.75 MHz are interpreted by the receiver as a "1" data bit. The backscattered '0' signal in Channel 37 is shown in FIG. 6B. Channel 37 has a center frequency of 2402 MHz. The backscattered Channel 38 signal from FIG. 6A backscattered as a '0' may provide signal (shown in FIG. 6B) at 2402 MHz−250 kHz=2401.75 MHz and 2402 MHz−750 kHz=2401.25 MHz, both of which may be interpreted as a '0'. The backscattered Channel 38 signal from FIG. 6A backscattered as a '1' may provide signal (shown in FIG. 6C) at 2402 MHz+250 kHz=2402.25 MHz and 2402 MHz+750 kHz=2402.75 MHz, both of which may be interpreted as a '1'.

From the foregoing it will be appreciated that although specific embodiments of the technology have been described herein for purposes of illustration, various modifications may be made without deviating from the spirit and scope of the technology. Also, in some embodiments the microcontroller can be omitted, or the battery can be larger. Further, certain aspects of the new technology described in the context of particular embodiments may be combined or eliminated in other embodiments. Moreover, while advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

What is claimed is:

1. A device comprising:
   an antenna configured to receive an incident signal having a carrier frequency;
   a modulator; and
   a symbol generator, wherein the symbol generator is configured to provide a subcarrier frequency, and wherein the symbol generator is further configured to control the modulator to backscatter the incident signal having the carrier frequency using the subcarrier frequency to provide a backscattered signal to the antenna, the backscattered signal including a bandpass signal in a predetermined frequency range, wherein the predetermined frequency range is a range specified by a wireless communication standard comprising at least one of a WiFi standard, a Bluetooth standard, a Zigbee standard, or a cellular standard
   wherein the incident signal comprises a signal arranged in accordance with a wireless communication protocol, and wherein the incident signal comprises a Bluetooth signal.

2. The device of claim 1, wherein the backscattered signal comprises a Bluetooth advertising packet.

3. A method comprising:
   receiving an incident signal having a carrier frequency, the incident signal comprising at least one of a television transmission signal, a cellular communication signal, a WiFi signal, a Bluetooth signal, or a Zigbee signal;
   backscattering the incident signal to provide a backscattered signal, wherein the backscattering comprises:
   modulating, using a backscatter device, impedance presented to at least one antenna in accordance with data to be provided in the backscattered signal; and
   mixing the carrier frequency with at least one subcarrier provided by the backscatter device.

4. The method of claim 3, wherein the mixing results in a bandpass signal having a predetermined frequency range.

5. The method of claim 4, wherein the predetermined frequency range comprises a range of a channel in accordance with a wireless communication standard.

6. The method of claim 3, wherein the modulating comprises modulating the amplitude, frequency, and/or phase of the backscattered signal in a pattern indicative of the data to be provided in the backscattered signal.

7. The method of claim 3, wherein the data to be provided in the backscattered signal comprises a packet having a preamble, an access address, a payload data unit, and a cyclic redundancy check.

8. The method of claim 3, further comprising transmitting the backscattered signal.

9. The method of claim 3, wherein the backscattered signal comprises a reading of a sensor associated with a device providing the backscattered signal.

10. The method of claim 3, wherein the backscattered signal comprises an identification of an asset associated with a device providing the backscattered signal.

11. The method of claim 10, wherein the device providing the backscattered signal comprises a tag.

12. The method of claim 3, wherein the incident signal comprises a data-carrying signal.

13. The method of claim 3, wherein the incident signal comprises a signal arranged in accordance with a wireless communication protocol.

14. The method of claim 13, wherein the incident signal comprises a Bluetooth signal.

15. The method of claim 14, wherein the backscattered signal comprises a Bluetooth advertising packet.

16. A system comprising:
   a signal source configured to provide an incident signal comprising at least one of a television transmission signal, a radio transmission signal, a cellular communication signal, a WiFi signal, a Bluetooth signal, or a Zigbee signal;
   a backscatter device comprising:
      an antenna configured to receive the incident signal having a carrier frequency;
      a modulator; and
         a symbol generator, wherein the symbol generator is configured to provide a subcarrier frequency, and wherein the symbol generator is further configured to control the modulator to backscatter the incident signal having the carrier frequency using the subcarrier frequency to provide a backscattered signal comprising at least one of another WiFi signal or another Bluetooth signal, the backscattered signal including a bandpass signal in a predetermined frequency range; and
   a wireless communication device configured to receive the backscattered signal using antenna and receiver components also used to receive communication signals which are not backscattered.

17. The system of claim 16, wherein the wireless communication device and the signal source are wholly or partially integrated into a same device.

18. The system of claim 17, wherein the same device is configured to operate in a full duplex mode for transmission of the incident signal in one channel and receipt of the backscattered signal in a second channel different from the one channel.

19. The system of claim 16, wherein the wireless communication device and the signal source are separate devices.

20. The system of claim 16, wherein the incident signal has an incident signal duration and wherein a duration of the backscattered signal is configured to be less than the incident signal such that the backscattered signal is provided by the backscatter device during a time the incident signal is present.

21. The system of claim 16, wherein the incident signal and the backscattered signal are each formatted in accordance with a wireless communication protocol.

22. The system of claim 16 where the backscatter device further comprises a receiver configured to receive the incident signal.

23. The system of claim 22 wherein the receiver is configured to determine whether the incident signal is present, and if so to provide an indication to generate the backscattered signal during a time the incident signal is present.

24. The system of claim 22 wherein the receiver is configured to obtain an expected duration of the incident signal by measuring a duration of the incident signal or decoding at least a portion of the incident signal or combinations thereof.

25. The system of claim 24 wherein the backscatter device is configured to provide the backscattered signal having a duration less than the expected duration of the incident signal.

26. The system of claim 16 wherein the backscatter device includes a deterministic or random timer configured to provide an indication of when to generate the backscattered signal.

27. The system of claim 16 further comprising multiple backscatter devices.

28. The system of claim 27 wherein the multiple backscatter devices are configured to simultaneously provide multiple band-pass backscattered signals in multiple different frequency ranges.

29. The system of claim 27 wherein the multiple backscatter devices are configured to sequentially provide backscatter signals at different times.

\* \* \* \* \*